US012613813B2

(12) United States Patent
Ji

(10) Patent No.: US 12,613,813 B2
(45) Date of Patent: Apr. 28, 2026

(54) CXL DEVICE, ELECTRONIC DEVICE, AND DATA STORING METHOD

(71) Applicant: Samsung Electronics Co., Ltd., Suwon-si (KR)

(72) Inventor: Soo-Young Ji, Suwon-si (KR)

(73) Assignee: Samsung Electronics Co, Ltd., Gyeonggi-do (KR)

(*) Notice: Subject to any disclaimer, the term of this patent is extended or adjusted under 35 U.S.C. 154(b) by 0 days.

(21) Appl. No.: 18/635,749

(22) Filed: Apr. 15, 2024

(65) Prior Publication Data

US 2025/0147902 A1 May 8, 2025

(30) Foreign Application Priority Data

Nov. 6, 2023 (KR) ........................ 10-2023-0151702

(51) Int. Cl.
*G06F 13/16* (2006.01)
*G06F 12/02* (2006.01)

(52) U.S. Cl.
CPC ...... *G06F 13/1663* (2013.01); *G06F 12/0292* (2013.01); *G06F 13/1626* (2013.01)

(58) Field of Classification Search
None
See application file for complete search history.

(56) References Cited

U.S. PATENT DOCUMENTS

| | | | |
|---|---|---|---|
| 10,628,364 B2 | 4/2020 | Shim | |
| 11,126,364 B2 | 9/2021 | Karr et al. | |
| 11,316,917 B2 | 4/2022 | Kachare et al. | |
| 11,561,714 B1 | 1/2023 | Mertes et al. | |
| 12,192,024 B2 * | 1/2025 | Coury | ..................... H04L 45/74 |
| 2009/0248617 A1 | 10/2009 | Molini | |
| 2012/0254524 A1 | 10/2012 | Fujimoto | |
| 2019/0065057 A1 * | 2/2019 | Wakchaure | ........... G06F 3/0655 |
| 2019/0155777 A1 | 5/2019 | Shim | |
| 2021/0019070 A1 | 1/2021 | Karr et al. | |
| 2021/0263651 A1 | 8/2021 | Sandvig | |
| 2021/0281639 A1 | 9/2021 | Kachare et al. | |
| 2021/0373951 A1 | 12/2021 | Malladi et al. | |
| 2023/0110067 A1 | 4/2023 | Lagrange Moutinho Dos Reis et al. | |
| 2023/0221885 A1 | 7/2023 | Moon | |
| 2023/0222062 A1 | 7/2023 | Ji | |
| 2024/0176762 A1 * | 5/2024 | Manjanatha | ........ G06F 16/1774 |

OTHER PUBLICATIONS

Extended European Search Report for corresponding European Patent Application No. 24187650.7 dated Jan. 16, 2025.

* cited by examiner

*Primary Examiner* — Edward J Dudek, Jr.

*Assistant Examiner* — Ralph A Verderamo, III

(74) *Attorney, Agent, or Firm* — HARNESS, DICKEY & PIERCE, P.L.C.

(57) ABSTRACT

A CXL device according to an example embodiment may include: a memory configured to storing first data; and a control logic configured to calculate a first use ratio of the CXL device, and configured to output second data that are part of first data, stored in the CXL device, to an external share memory through a CXL interface in response to the first use ratio being greater than a reference value.

20 Claims, 19 Drawing Sheets

CXL DEVICE, ELECTRONIC DEVICE, AND DATA STORING METHOD

CROSS-REFERENCE TO RELATED APPLICATION

This application claims priority under 35 U.S.C. § 119 and the benefit of Korean Patent Application No. 10-2023-0151702 filed in the Korean Intellectual Property Office on Nov. 6, 2023, the entire contents of which are incorporated herein by reference.

BACKGROUND

The present disclosure relates to a CXL device, an electronic device, and a data storing method.

Due to use of specialized workloads such as compression, encryption, and artificial intelligence and rapid increase of data, a demand for heterogeneous computing in which an accelerator developed for a special purpose works together with a general-purpose processor is increasing.

The accelerator requires a high-performance connection to the processor, ideally sharing a memory space to reduce overhead and latency. For this reason, there is research on chip-to-chip interconnect protocols that maintain memory and cache-coherence by connecting the processor to various accelerators.

SUMMARY

Example embodiments may provide a CXL device, an electronic device, and a data storing method for efficiently managing memory resources.

Example embodiments may provide a CXL device, an electronic device, and a data storing method for reducing data skew.

An embodiment provides a compute express link (CXL) device including: a memory configured to store first data; and a control logic configured to calculate a first use ratio of the CXL device, and configured to output second data that are part of first data, stored in the CXL device, to an external share memory through a CXL interface in response to the first use ratio being greater than a reference value.

Another embodiment provides an electronic device including: a first CXL device configured to store second data that are part of first data to a second CXL device in response to a read request on the first data being greater than a reference number; a second CXL device configured to store the second data in response to a request of the first CXL device; and a switch configured to connect the first CXL device and the second CXL device.

Another embodiment provides a method for storing data including: transmitting first data to a host in response to a device receiving a first read request on the first data from the host; selecting one of share memories in response to a receiving number of the first read request is greater than a reference number; determining second data that are part of the first data based on a size of the first data, a first transmission rate of the selected share memory, and a second transmission rate of the device; writing the second data to the selected share memory; and requesting transmission of the second data to the selected share memory and transmitting third data that are exclusive of the second data from among the first data to the host in response to receiving a second read request of the first data from the host.

DETAILED DESCRIPTION

Figure 1:
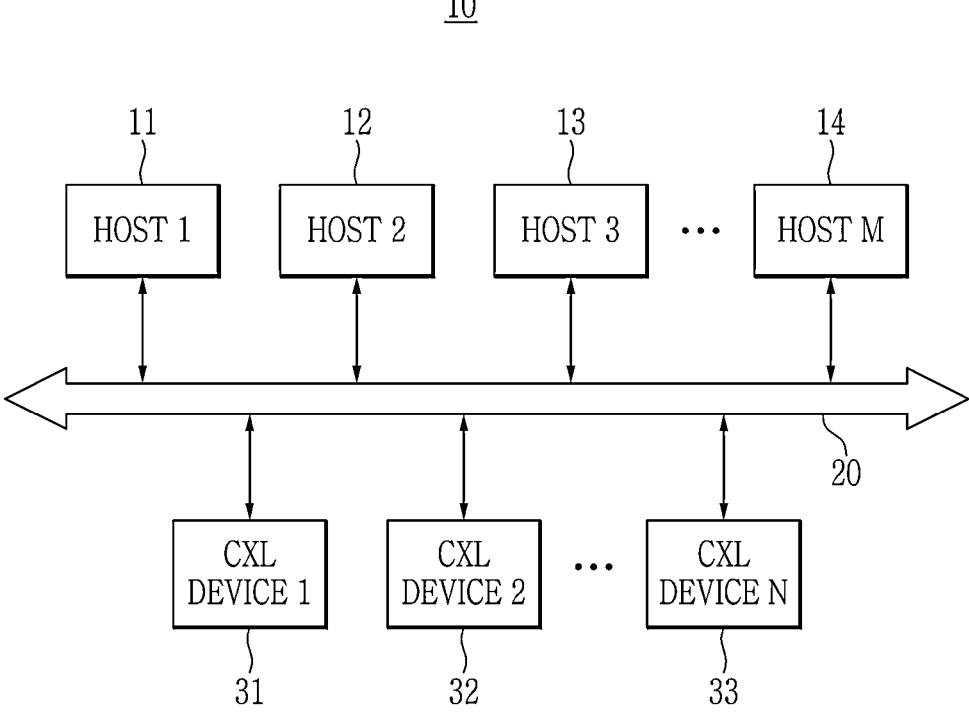
FIG. 1 shows a block diagram on a computing system according to some example embodiments.

In the following detailed description, only certain example embodiments of the present disclosure have been shown and described, simply by way of illustration. As those skilled in the art would realize, the described example embodiments may be modified in various different ways, all without departing from the spirit or scope of the present disclosure.

Accordingly, the drawings and description are to be regarded as illustrative in nature and not restrictive, and like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

One or more of the elements disclosed below may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

FIG. 1 shows a block diagram on a computing system according to some example embodiments.

Referring to FIG. 1, the computing system 10 may be included in user devices such as a personal computer, a laptop computer, a server, a data center, a media player, or a digital camera, or in automotive devices such as a GPS, a black box, or a vehicle electric device. Alternatively, the computer system 10 may be a mobile system such as a mobile phone, a smart phone, a tablet personal computer, a wearable device, a healthcare device, or an Internet of things (IoT) device.

The computing system 10 may include hosts 11 to 14 and compute express link (CXL) device 31 to 33. The hosts 11 to 14 and the CXL devices 31 to 33 may be connected to a cache coherence interface 20 through different physical ports. That is, as the CXL devices 31 to 33 are connected to the cache coherence interface 20, a memory area managed by the hosts 11 to 14 may have high capacity, and the CXL devices 31 to 33 may exchange data with each other. The hosts 11 to 14 may include first to M-th hosts (M is an integer that is greater than 1). The CXL devices 31 to 33 may include first to N-th CXL devices (N is an integer that is greater than 1).

The cache coherence interface 20 may indicate a low-latency and high-bandwidth link that may support coherency, memory access, and dynamic protocol multiplexing of an input/output (I/O) protocol to enable various connections between accelerators, memory devices, or various electronic devices.

In some example embodiments, the cache coherence interface 20 may be realized with a CXL interface. The CXL interface may include a lower protocol such as a CXL.io protocol, a CXL.mem protocol, or a CXL.cache protocol. The CXL.io protocol may include an I/O semantic that is similar to a PCIe. The CXL.cache protocol may include caching semantic, the CXL.mem protocol may include memory semantic, and the caching semantic and the memory semantic may be optional. In some example embodiments, the hosts 11 to 14 may transmit instruction signals to the CXL devices 31 to 33 through the CXL.io protocol, and may receive data that correspond to the instruction signals through the CXL.io protocol. The CXL devices 31 to 33 may transmit and receive data to/from each other through the CXL.mem protocol.

The cache coherence interface 20 is not limited to the CXL interface, and the hosts 11 to 14 and the CXL devices 31 to 33 may communicate with each other based on various types of computing interfaces such as a GEN-Z protocol, an NVLink protocol, a cache coherent interconnect for accelerators (CCIX) protocol, or an open coherent accelerator processor interface (CAPI) protocol.

The hosts 11 to 14 may control general operations of the computing system 10. In some example embodiments, the hosts 11 to 14 may respectively be one of various processors such as a central processing unit (CPU), a graphics processing unit (GPU), a neural processing unit (NPU), or a data processing unit (DPU). In some example embodiments, the hosts 11 to 14 may include a single core processor or a multi-core processor. The respective hosts 11 to 14 may be connected to at least one memory device through a double data rate (DDR) interface and may transmit and receive data. The hosts 11 to 14 may include a memory controller for controlling at least one memory device. However, a range of the present disclosure is not limited thereto, and the hosts 11 to 14 may communicate with at least one memory device through various types of interfaces.

In some example embodiments, the hosts 11 to 14 may transmit a read request to the CXL devices 31 to 33, and the CXL devices 31 to 33 may transmit data to the hosts 11 to 14 based on the read request. In some example embodiment, the hosts 11 to 14 may divide jobs, may distribute the jobs to the CXL devices 31 to 33, and may collect results. The hosts 11 to 14 may distribute the jobs including data and programs (e.g., workloads) for processing the data to the CXL devices 31 to 33.

The respective CXL devices 31 to 33 may be a memory device (or module) or a storage device (or module). The memory device may be a dynamic random access memory (DRAM) device, and may have various form factors such as a dual in-line memory module (DIMM) or a high bandwidth memory (HBM). However, the range of the present disclosure is not limited thereto, and the memory device may include a non-volatile memory such as a flash memory, a phase-change random access memory (PRAM), a resistive random access memory (RRAM), a magneto resistive random access memory (MRAM), or a ferroelectric random access memory (FRAM). Also, the storage device may be realized with various types of storage devices such as a solid-state drive (SSD), an embedded multimedia card (eMMC), a universal flash storage (UFS), a compact flash (CF), a secure digital (SD), a micro secure digital (Micro-SD), a mini secure digital (Mini-SD), an extreme digital (xD), or a memory stick.

When the hosts 11 to 14 simultaneously access a specific CXL device (e.g., first CXL device 31) in the computing system 10, a data skew may be generated to the first CXL device 31 because of a bottle neck phenomenon. The first CXL device 31 may move data to another CXL device (e.g., at least one of the second to N-th CXL devices 32 to 33) to alleviate the data skew.

For example, the first CXL device 31 may move second data that are part of the large-capacity first data that are frequently accessed to the second CXL device 32. The second CXL device 32 may receive the second data from the first CXL device 31 and may store them. The first CXL device 31 may store third data that are exclusive of the second data from among the first data. For example, the third data may be data among the first data other than the second data. In response to a read request of the first data, the first CXL device 31 may output the third data, and the second CXL device 32 may output the second data. The read request may be the instruction transmitted by at least one of the hosts 11 to 14. Hence, the computing system 10 may achieve an efficient space management through data dispersion, and latency on the first data of the hosts 11 to 14 may be reduced.

The first CXL device 31 may calculate a use ratio of the first CXL device 31. In some example embodiments, the use ratio may indicate an operation time of the first CXL device 31 with ratios for an entire time (e.g., one hour, one day, one week, one month, etc.). In some example embodiment, the use ratio may represent capacity in use from among the entire capacity (memory capacity or storage space) of the first CXL device 31 by ratios. In some example embodiments, the use ratio may represent access frequencies of respective data from among the entire data by ratios. The first CXL device 31 may move data when the use ratio is greater than a reference value.

In some example embodiments, the first CXL device 31 may determine the CXL device that has the use ratio that is equal to or less than a reference value from among the second to N-th CXL device 32 to 33 to be a target device. The first CXL device 31 may move data to the determined CXL device that is a target device.

In some example embodiments, the first CXL device 31 may determine the data (first data) that are a target of movement from among the data stored based on at least one of data capacity and/or access frequency. For example, the first CXL device 31 may determine the data that are accessed the most per time to be the first data. The first CXL device 31 may determine the data with the greatest capacity to be the first data. The first CXL device 31 may move a portion of the first data.

In some example embodiments, the first CXL device 31 may determine a ratio of the data (second data) to be moved from among the first data and residual data (third data). The first CXL device 31 may determine the ratio of the second data and the third data based on a data rate ratio of the first CXL device 31 and the target device (e.g., second CXL device 32). The data rate ratio may represent a ratio of a first data rate between the host and the first CXL device 31 and a second data rate between the host and the second CXL device 32. The first CXL device 31 may determine a size ratio of the third data and the second data to be a:b (a and b are real numbers that are greater than 0) when a data rate ratio of the first CXL device 31 and the second CXL device 32 are determined to be a:b.

FIG. 1 shows a configuration in which the first CXL device 31 moves the second data to the second CXL device 32, but the embodiment is not limited thereto, and the first CXL device 31 may move a portion of the first data to at least two CXL devices. For example, the first CXL device 31 may move the second data from among the first data to the third CXL device, and may move the third data to the fourth CXL device. The first CXL device 31 may store fourth data that are exclusive of the second and third data from among the first data. In response to the read request of the first data, the first CXL device 31 may output the fourth data, and the third and fourth CXL devices may respectively output the second and third data.

Figure 5:
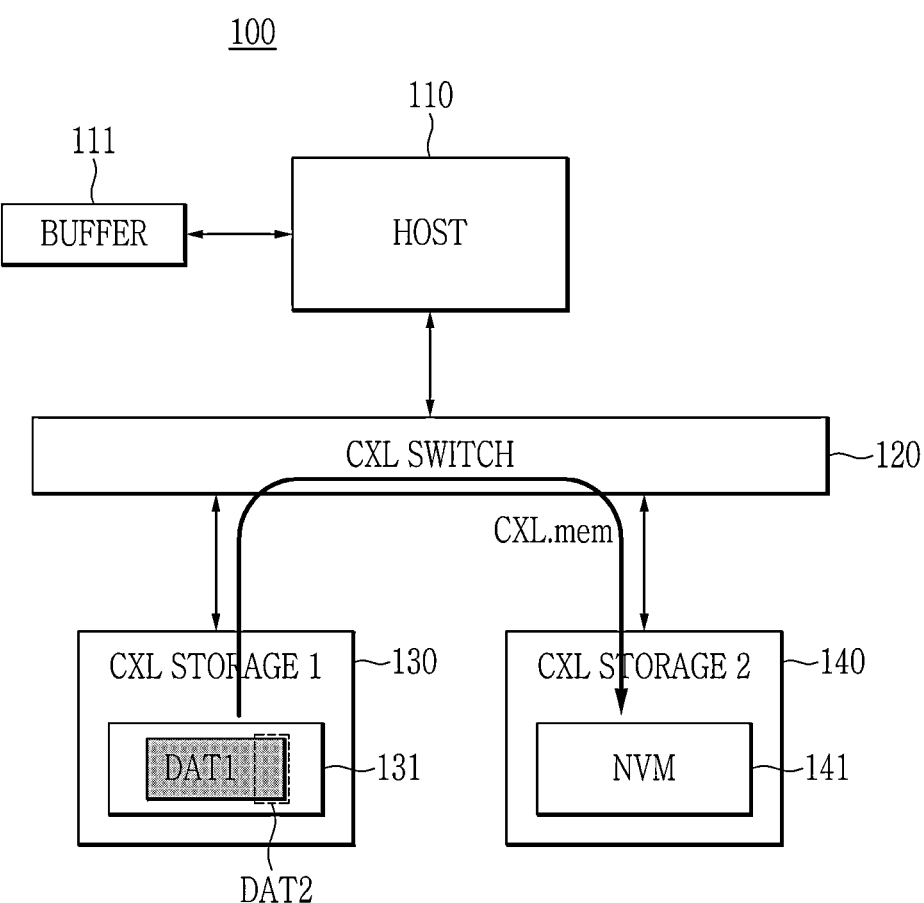
Figure 6:
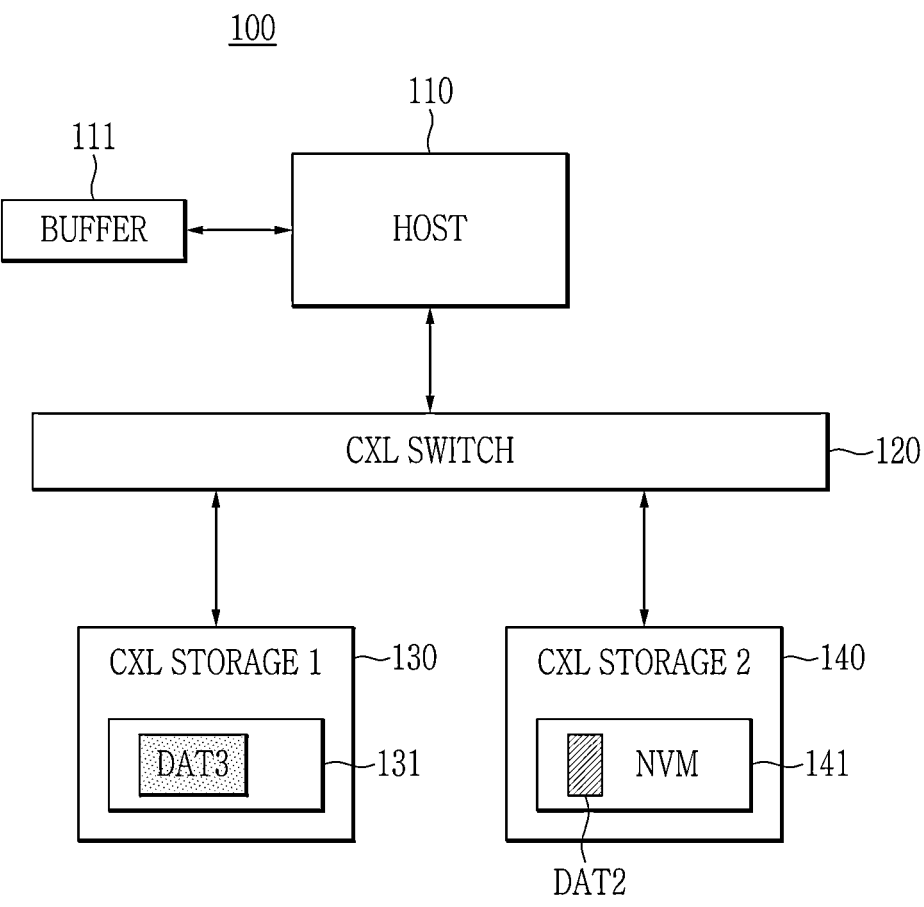
Figure 7:
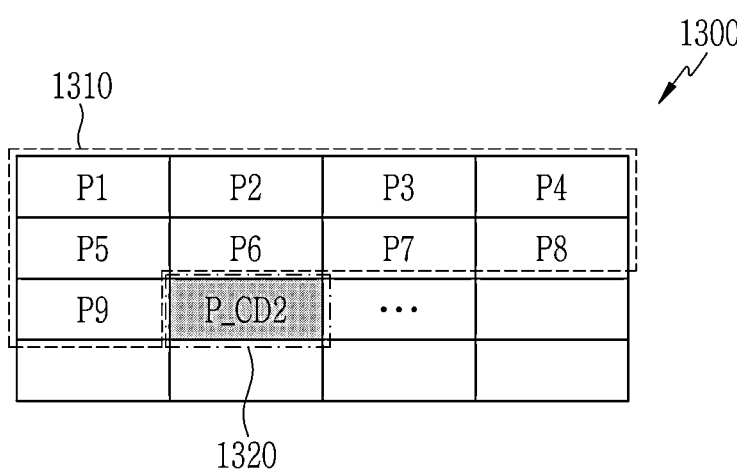
FIG. 7 shows an example of a map table managed by a first CXL storage device according to some example embodiments.
Figure 8:
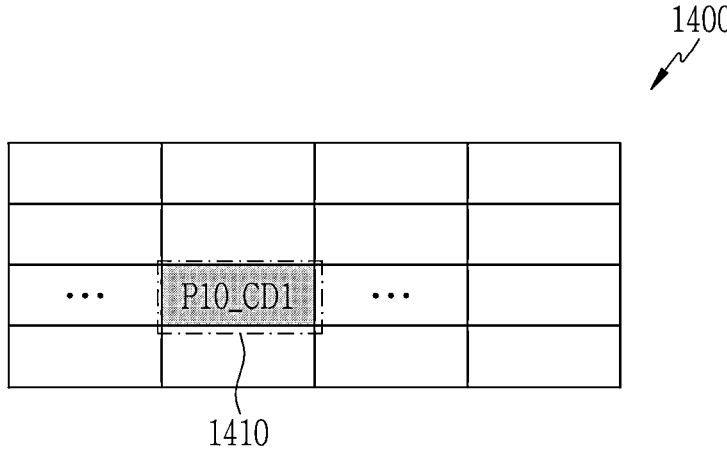
FIG. 8 shows an example of a map table managed by a second CXL storage device according to some example embodiments.

FIG. 2 to FIG. 6 show block diagrams on an operation of a computing system according to some example embodiments, FIG. 7 shows an example of a map table managed by a first CXL storage device according to some example embodiments, and FIG. 8 shows an example of a map table managed by a second CXL storage device according to some example embodiments.

Figure 2:
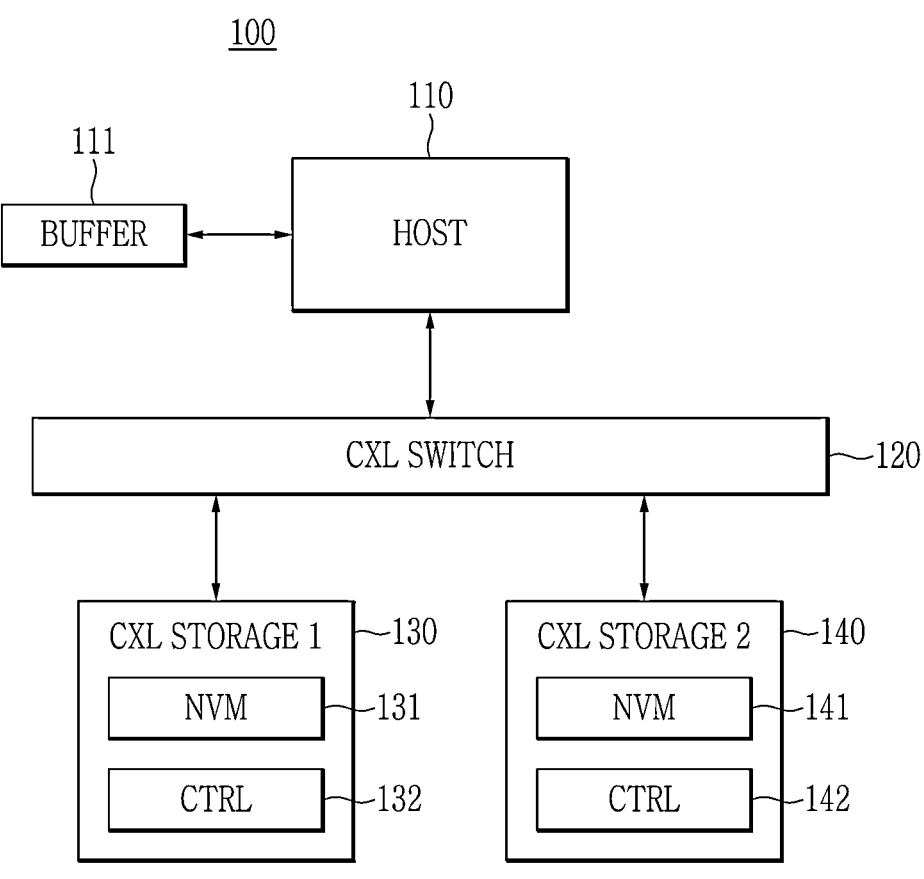
FIG. 2 to FIG. 6 show block diagrams on an operation of a computing system according to some example embodiments.

Referring to FIG. 2, the computing system 100 may include a host 110, a buffer 111, a CXL switch 120, a first CXL storage device 130, and a second CXL storage device 140. FIG. 2 shows that, for better understanding and ease of description, the computing system 100 includes one host 110 and two CXL storage devices 130 and 140, but the example embodiments are not limited thereto, and the computing system 100 may include at least one host and at least two CXL storage devices. For example, the computing system 100 may include a third CXL device. The computing system 100 may include N CXL devices (N being an integer greater than 0).

The host 110 may transmit the instruction to at least one of the first CXL storage device 130 and the second CXL storage device 140. For example, the host 110 may include a CXL controller, and the CXL controller may communicate with the CXL storage devices 130 and 140 through the CXL switch 120.

The host 110 may be connected to the buffer 111 storing data. The buffer 111 may be used as a main memory or a system memory of the computing system 100. In some example embodiments, the buffer 111 may be a DRAM device, and may have various form factors such as the DIMM or the HBM. However, the range of the present disclosure is not limited thereto, and the buffer 111 may include non-volatile memories such as the flash memory, the PRAM, the RRAM, the MRAM, or the FRAM.

The buffer 111 may directly communicate with the host 110 through the DDR interface. In some example embodiments, the host 110 may include a memory controller for controlling the buffer 111. However, the range of the present disclosure is not limited thereto, and the buffer 111 may communicate with the host 110 through various types of interfaces. The host 110 may be connected to at least one buffer 111 and may communicate with the same.

The buffer 111 may store the data received from at least one of the first CXL storage device 130 and the second CXL storage device 140. According to some example embodiments, the buffer 111 may be realized into a memory disposed in the host 110.

At least one of the first CXL storage device 130 and the second CXL storage device 140 may receive instructions from the host 110. The CXL storage devices 130 and 140 may include non-volatile memories (NVM) 131 and 141 and controllers 132 and 142. The non-volatile memories 131 and 141 may store data. The non-volatile memories 131 and 141 may write, output, or erase the data based on the control of the controllers 132 and 142. However, the example embodiments are not limited thereto. For example, the computing system 100 may include N non-volatile memories (N being an integer greater than).

The controllers 132 and 142 may control operations of the CXL storage devices 130 and 140 based on the instruction of the host 110. For example, the controllers 132 and 142 may write data to the non-volatile memories 131 and 141 or may output or erase the data of the non-volatile memories 131 and 141 based on the instructions of the host 110. In some example embodiments, the controllers 132 and 142 may write data to the non-volatile memories 141 and 131 of the CXL storage device, or may output or erase the data of the non-volatile memories 141 and 131. For example, the controller 132 of the first CXL storage device 130 may write data to the non-volatile memory 141 of the second CXL storage device 140, or may output or erase the data of the non-volatile memory 141.

The controllers 132 and 142 may be connected to the CXL switch 120. The controllers 132 and 142 may communicate with the host 110 and/or other CXL devices through the CXL switch 120. The controllers 132 and 142 may include an architecture of PCIe 5.0 (or other versions) for a CXL.io path, or may add a specific CXL.cache and CXL.mem path to the CXL. In some example embodiments, the controllers 132 and 142 may be reversely compatible with previous cache coherence protocols such as CXL 1.1 or CXL 2.0. The controllers 132 and 142 may realize the CXL.io, CXL.mem, and CXL.cache protocol or other appropriate cache coherence protocols. The controllers 132 and 142 may support different CXL device types such as type 1, type 2, and/or type 3 CXL device. The controllers 132 and 142 may support the PCIe protocol such as the PCIe 5.0 protocol or the PCIe 6.0 protocol. The controllers 132 and 142 may support the PIPE 5.x protocol by using an arbitrary and appropriate PHY interface for PCI express (PIPE) interface width (e.g., 8-, 16-, 32-, 64-, and 128-bit configurable PIPE interface width).

The controllers 132 and 142 may include an intellectual property (IP) circuit designed to realize an application specific integrated circuit (ASIC) and/or a field-programmable gate array (FPGA). In various embodiments, the controllers 132 and 142 may support the CXL interface (e.g., CXL 3.0 specification or other arbitrary versions).

The host 110, the first CXL storage device 130, and the second CXL storage device 140 may communicate with each other through the CXL switch 120. The CXL switch 120 may be included in the CXL interface. The CXL switch 120 may be used to realize a memory cluster through one-to-many and many-to-one switching between the connected CXL storage devices 130 and 140. For example, (i) the CXL switch 120 may connect route ports to an end point, (ii) may connect a route port to end points, or (iii) may connect route ports to end points.

The CXL switch 120 may provide a packet-switching function on a CXL packet. The CXL switch 120 may connect the CXL storage devices 130 and 140 to at least one host 110. The CXL switch 120 may (i) allow the CXL storage devices 130 and 140 to include various types of memories with different characteristics, (ii) virtualize the memories of the CXL storage devices 130 and 140 and store data with different characteristic (e.g., access frequency) in an appropriate type of memory, and (iii) support a remote direct memory access (RDMA). Here, to virtualize the memories may represent to convert memory addresses between the processing circuit and the memory.

The CXL switch 120 may arbitrate communication among the host 110, the first CXL storage device 130, and the second CXL storage device 140. For example, when the host 110 communicates with the CXL storage devices 130 and 140, the CXL switch 120 may transmit information such as requests, data, responses, or signals transmitted from the host 110 or the CXL storage devices 130 and 140 to the CXL storage devices 130 and 140 or the host 110 through the CXL.io protocol.

When the first CXL storage device 130 communicates with the second CXL storage device 140, the CXL switch 120 may transmit information such as requests, data, responses, or signals between the first CXL storage device 130 and the second CXL storage device 140 through the CXL.mem protocol.

The first CXL storage device 130 communicates with the second CXL storage device 140 through the CXL.mem protocol, and they may be independently operated from the CXL.io protocol of the host 110. In other words, the controller 132 may communicate with the host 110 through the CXL.io protocol, and may communicate with the controller 142 through the CXL.mem protocol. Hence, the communication between the first CXL storage device 130 and the second CXL storage device 140 may give a limited influence to the input/output latency of the host 110.

Figure 3:
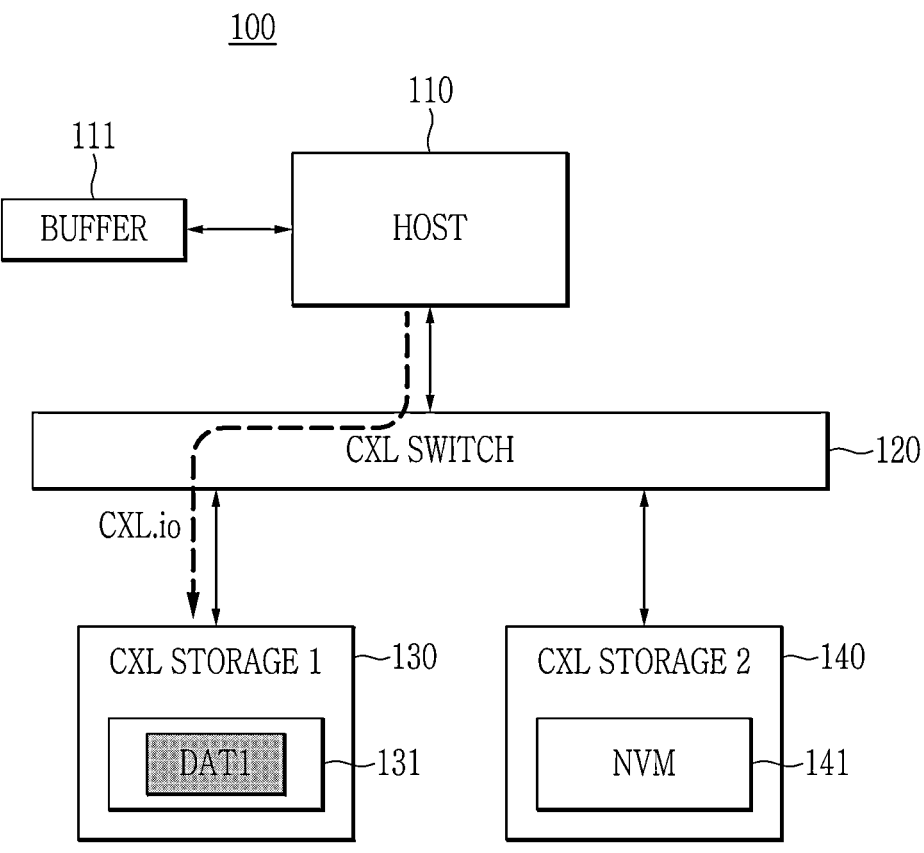

Referring to FIG. 3, the host 110 may transmit instructions to the first CXL storage device 130 through the CXL.io protocol of the CXL switch 120. For example, the instruction may be a read request on first data DAT1. The host 110 may transmit an address of the first data DAT1 and an address of the buffer 111 together with the read request on the first data DAT1 to the first CXL storage device 130. The first CXL storage device 130 may receive the read request on the first data DAT1, the address of the first data DAT1, and the address of the buffer 111 from the host 110.

Figure 4:
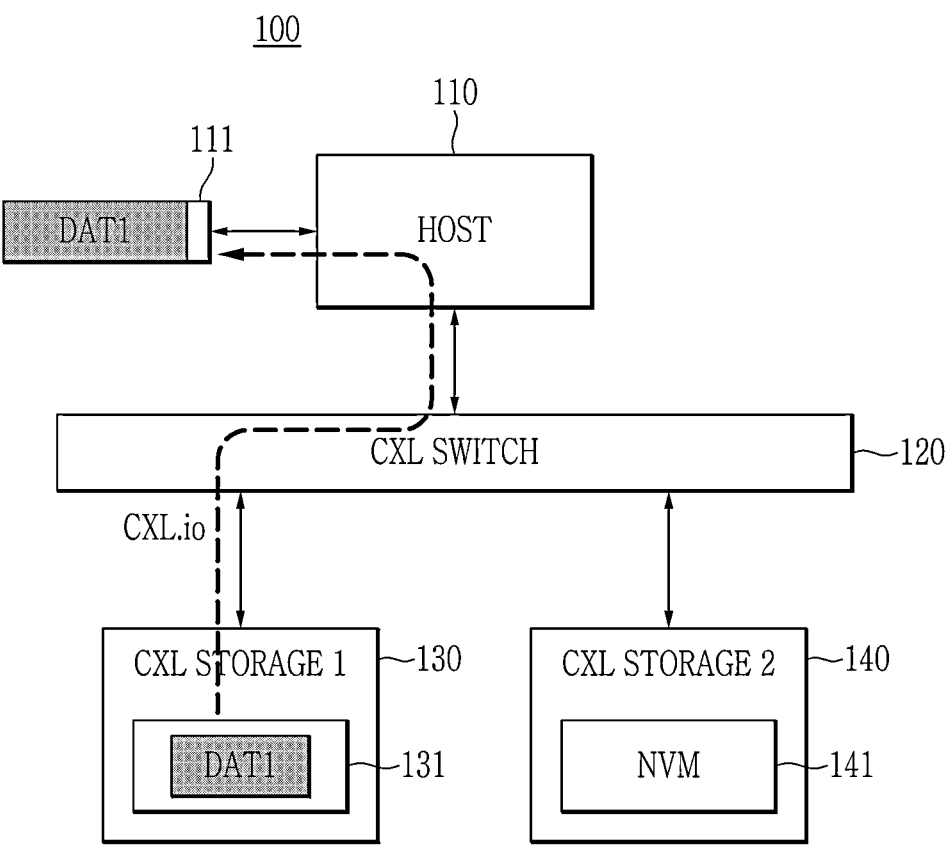

Referring to FIG. 4, the first CXL storage device 130 may read the first data DAT1 from the non-volatile memory 131 based on the address of the first data DAT1. The first CXL storage device 130 may write the first data DAT1 to the buffer 111 based on the address of the buffer 111. The first CXL storage device 130 may transmit the first data DAT1 through the CXL.io protocol of the CXL switch 120. The buffer 111 may receive the first data DAT1 from the first CXL storage device 130 and may store them.

Referring to FIG. 5, the first CXL storage device 130 may calculate the use ratio. For example, the controller 132 of FIG. 2 may calculate the use ratio of the first CXL storage device 130. In some example embodiments, the use ratio may indicate an operation time of the first CXL storage device 130 with ratios for an entire time (e.g., one hour, one day, one week, one month, etc.). The operation time may represent a time when the power is turned off or a state that is not an idle state is maintained. In some example embodiments, the use ratio may be a ratio of the capacity in use from among the entire capacity of the non-volatile memory 131. In some example embodiments, the use ratio may be a ratio of an access frequency of the entire data stored in the non-volatile memory 131. The controller 132 may determine to move data to another CXL device when the use ratio is greater than a reference value.

The controller 132 may determine a target device to which data will be moved. The controller 132 may obtain the use ratios of the respective CXL devices connected through the CXL switch 120.

The controller 132 may determine at least one of the CXL devices to be a target device based on the respective use ratios of the CXL devices. For example, the controller 132 may determine the second CXL storage device 140 with the lowest use ratio from among the CXL devices to be the target device. In some example embodiments, the controller 132 may further determine another CXL device to be the target device in addition to the second CXL storage device 140.

The controller 132 may determine the target data to be moved. The controller 132 may determine a read request number of data stored in the non-volatile memory 131. In some example embodiments, the controller 132 may determine the read request number within a reference time. The controller 132 may determine whether the read request number is greater than the reference number.

The controller 132 may determine target data based on the read request number. In some example embodiments, the controller 132 may determine some of the data of which the read request number is greater than a reference number from among the data of the non-volatile memory 131 as target data. In some example embodiments, the controller 132 may determine some of the data of which the read request number is the greatest from among the data of the non-volatile memory 131 as target data. For example, the controller 132 may determine the second data DAT2 that are a portion of the first data DAT1 as target data. That is, the controller 132 may determine that the second data DAT2 are stored in the second CXL storage device 140. The controller 132 may output the second data DAT2 to the second CXL storage device 140.

In some example embodiments, the controller 132 may determine target data. For example, the controller 132 may determine some of the data with the second greatest read request number as target data. The controller 132 may determine the size ratio among the target data.

The controller 132 may determine the size of the target data. That is, the controller 132 may determine the ratio of the second data DAT2 to the first data DAT1. For example, the controller 132 may determine the size of the target data based on the rate of the first CXL storage device 130, the rate of the target device, and the size of the target data. The first data DAT1 may be sequential data, and the second data DAT2 may be an end portion of the first data DAT1. For example, when the controller 132 has determined the size of the target data to be 10%, the controller 132 may determine the last 10% of the first data DAT1 as the second data DAT2.

In some example embodiments, the controller 132 may obtain a first transmission rate between the first CXL storage device 130 and the host 110. The first transmission rate may represent a data communication rate of the first CXL storage device 130 through the CXL.io protocol. The controller 132 may determine the ratio of the first data DAT1 and the second data DAT2 that are target data based on the first transmission rate. For example, the controller 132 may determine the ratio of the second data DAT2 in a relatively low way when the first transmission rate is high. In a like way, the controller 132 may determine the ratio of the second data DAT2 in a relatively high way when the first transmission rate is low.

In some example embodiments, the controller 132 may obtain a second transmission rate between the host 110 and the second CXL storage device 140. The second transmission rate may represent a data communication rate of the second CXL storage device 140 through the CXL.io protocol. The controller 132 may determine the ratio based on the first transmission rate and the second transmission rate. The controller 132 may determine the ratio of the first data DAT1 and the second data DAT2 so that '(first transmission rate)/(first transmission rate+second transmission rate)' corresponds to 'size of second data DAT2/size of first data DAT1'. For example, the controller 132 may determine the ratio of the first data DAT1 and the second data DAT2 so that '(first transmission rate)/(first transmission rate+second transmission rate)' is proportional or equal to 'size of second data DAT2/size of first data DAT1'. In other words, the controller 132 may determine the size ratio of the data (e.g., third data or residual data) generated by excluding the second data DAT2 from the first data DAT1 and the second data DAT2 as a:b (a and b are real numbers that are greater than 0) when the ratio (e.g., data rate ratio) of the first transmission rate and the second transmission rate is a:b. In other words the controller 132 may determine the size ratio of the residual data and the target data (e.g. DAT2) as a:b when the ratio of the first transmission rate and the target transmission rate (e.g., second transmission rate) is a:b. For example, in some example embodiments where the computing system 100 includes N (N being an integer greater than 1) CXL storage devices the controller 132 may determine the size ratio of the residual data and N-th data, e.g. data to be moved to an N-th CXL storage device, as a:b when the ratio of the first transmission rate and the target transmission rate, e.g. a transmission rate between the host and the N-th CXL storage device, is a:b.

The controller 132 may determine whether to transmit the target data to the target device. In some example embodiments, the controller 132 may obtain the first time used when the first CXL storage device 130 transmits the first data DAT1 to the host 110, and may obtain the second transmission rate between the host 110 and the second CXL storage device 140. The controller 132 may determine whether to output the second data DAT2 based on the first time, the second transmission rate, and the size of the second data DAT2. For example, the controller 132 may calculate the second time of the second CXL storage device 140 based on the second transmission rate and the size of the second data DAT2. The controller 132 may output the second data DAT2 to the second CXL storage device 140 when the first time is longer than the second time. The controller 132 may not output the second data DAT2 to the second CXL storage device 140 when the first time is equal to or shorter than the second time. For example, in some example embodiments where the computing system 100 includes N CXL storage devices, the controller 132 may calculate the N-th time based on the N-th transmission rate and the size of the N-th data. The controller may output the N-th data to the N-th CXL storage device when the first time is longer than the N-th time.

In some example embodiments, the controller 132 may obtain the first time used when transmitting the first data DAT1 to the host 110, may obtain the first transmission rate between the first CXL storage device 130 and the host 110, and may obtain the second transmission rate between the host 110 and the second CXL storage device 140. The controller 132 may determine whether to output the second data DAT2 based on the first time, the first data DAT1, the second data DAT2, the first transmission rate, and the second transmission rate. For example, the controller 132 may calculate the second time for transmitting the third data DAT3 based on the size of the third data DAT3 that are exclusive of the second data DAT2 from among the first data DAT1 and the first transmission rate. The controller 132 may calculate the third time for transmitting the second data DAT2 based on the second transmission rate and the size of the second data DAT2. The controller 132 may output the second data DAT2 to the second CXL storage device 140 when the first time is longer than a summation of the second time and the third time. The controller 132 may not output the second data DAT2 to the second CXL storage device 140 when the first time is equal to or shorter than the summation of the second time and the third time. For example, in some example embodiments where the computing system 100 includes N CXL storage devices, the controller 132 may obtain the transmission rate for first to N-th CXL storage devices and the size of the data corresponding to the first to N-th CXL storage devices. The controller 132 may calculate the length of the first to N-th times based on the respective first to N-th transmission rates and the first to N-th data sizes. The controller may output the second to the N-th data to the respective second to the N-th CXL storage devices when the first time is longer than a summation of the second to N-th times.

The controller 132 may transmit the target data to the target device based on the target device, the target data, the size of the target data, and the determination of transmission. For example, the controller 132 may transmit the second data DAT2 to the second CXL storage device 140 by using the CXL.mem protocol. The controller 142 of FIG. 2 may store the data received from the first CXL storage device 130 into the non-volatile memory 141.

In some example embodiments, the controller 132 may indicate a first address that is a position in which the second data DAT2 are stored to the controller 142. The controller 142 may store the second data DAT2 in the non-volatile memory 141 based on the first address. The controller 132 may write the first address to the map table. The controller 142 may write the second data DAT2 to a second address when other data are written to the first address. The controller 142 may transmit the second address to the controller 132, and the controller 132 may write the second address to the map table.

In some example embodiments, the controller 132 may not indicate the position in which the second data DAT2 are stored to the controller 142. The controller 142 may determine a third address in which the second data DAT2 are stored in the non-volatile memory 141. The controller 142 may store the second data DAT2 in the third address, and may transmit the third address to the controller 132. The controller 132 may write the third address to the map table.

The controller 132 may determine whether the second CXL storage device 140 has completed the storage of the second data DAT2. In some example embodiments, the controller 142 of the second CXL storage device 140 may transmit a storage completed signal to the controller 132 when storing the second data DAT2 in the non-volatile memory 141. When receiving the storage completed signal from the second CXL storage device 140, the controller 132 may determine that storage of the second data DAT2 has been completed.

In some example embodiments, when having completed the storage of the second data DAT2, the second CXL storage device 140 may change a bit value of a region of the non-volatile memory 141, and the controller 132 may determine whether the storage of the second data DAT2 by the second CXL storage device 140 is completed based on the bit value of the region. For example, the controller 132 may check that storage of the second data DAT2 is completed when the bit value of the region is changed, and it may check that the storage of the second data DAT2 is not completed when the bit value of the region is not changed.

Referring to FIG. 6, the first CXL storage device 130 may move the second data DAT2 from among the first data DAT1 to the second CXL storage device 140, and may store the third data DAT3 from among the first data DAT1 in the non-volatile memory 131. The second CXL storage device 140 may store the second data DAT2 in the non-volatile memory 141. That is, when the use ratio of the first CXL storage device 130 is high, the second data DAT2 that are part of the first data DAT1 of the first CXL storage device 130 are dispersed to the second CXL storage device 140, thereby reducing the latency of the first data DAT1 of the hosts (including 110) of the computing system 100 and alleviating or reducing the data skew.

Referring to FIG. 6 to FIG. 8, the first CXL storage device 130 may manage a map table 1300, and the second CXL storage device 140 may manage a map table 1400.

The first CXL storage device 130 may have stored the address of the first data DAT1 in areas 1310 and 1320 of the map table 1300 before moving the second data DAT2. The first CXL storage device 130 may move the second data DAT2 to the second CXL storage device 140, and may correct (or update) the map table 1300. The first CXL storage device 130 may correct the address of the second data DAT2 on the map table 1300.

For example, the first CXL storage device 130 may maintain the addresses P1 to P9 on the third data DAT3 from among the first data DAT1. The first CXL storage device 130 may correct the address of the second data DAT2 from among the first data DAT1. That is, the first CXL storage device 130 may maintain the addresses P1 to P9 of the area 1310, and may correct the address of the area 1320. The sizes of the area 1310 and the area 1320 may be proportional to the sizes of the first data DAT1 and the second data DAT2, respectively. That is, when the size of the second data DAT2 moving to the second CXL storage device 140 increases, the size of the area 1310 may be reduced and the size of the area 1320 may be increased.

In some example embodiments, the first CXL storage device 130 may indicate the address in which the second data DAT2 are stored to the second CXL storage device 140. The address in which the second data DAT2 are stored may be the address of the non-volatile memory 141 of the second CXL storage device 140. In some example embodiments, the first CXL storage device 130 may not indicate the address in which the second data DAT2 are stored to the second CXL storage device 140. The second CXL storage device 140 may write the second data DAT2 to the non-volatile memory 141, and may write an address P10_CD1 to which the second data DAT2 are written to an area 1410 of the map table 1400.

The second CXL storage device 140 may transmit information P_CD2 on the area 1410 to the first CXL storage device 130. The first CXL storage device 130 may write the information P_CD2 to the area 1320 of the map table 1300. The information P_CD2 may correspond to the address P10_CD1. In some example embodiments, the information P_CD2 may be the address P10_CD1.

The first CXL storage device 130 may, when receiving a read request on the first data DAT1 from the host 110, request the second CXL storage device 140 to transmit the second data DAT2 based on information P_CD2 of the area 1320. The second CXL storage device 140 may transmit the second data DAT2 to the host 110 in response to the request of the first CXL storage device 130.

FIG. 9 to FIG. 12 show block diagrams on an operation of a computing system according to an embodiment.

Figure 9:
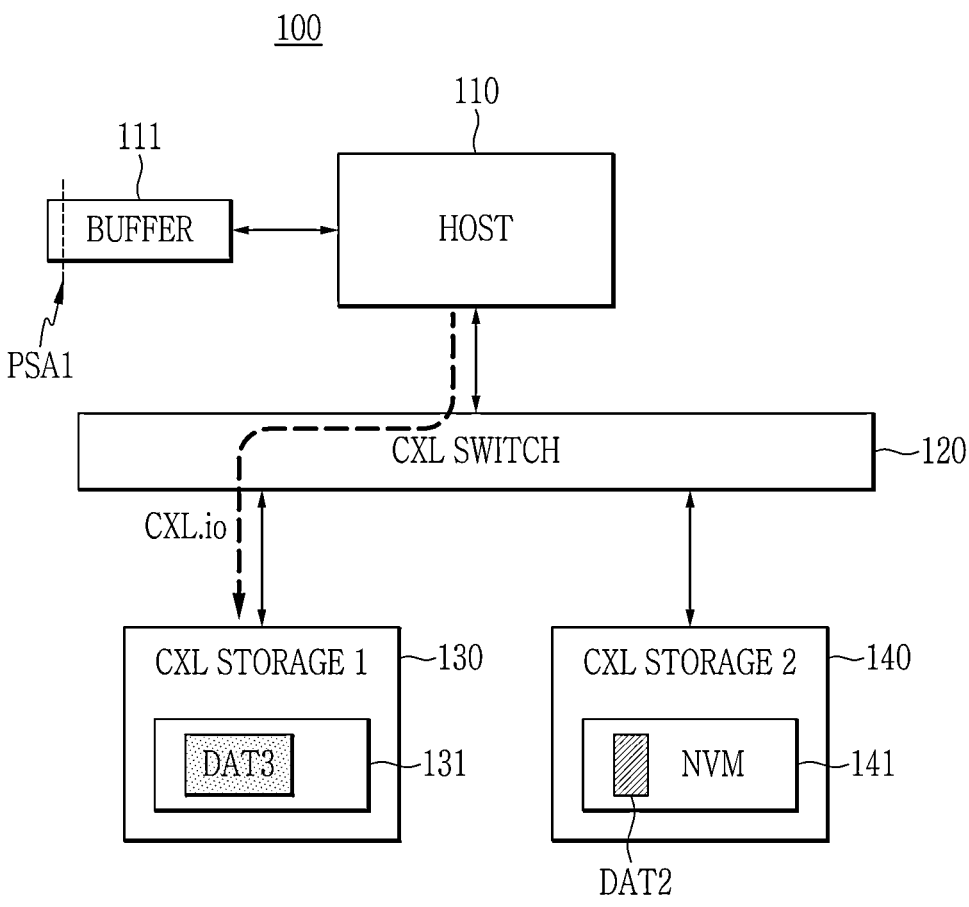
FIG. 9 to FIG. 12 show block diagrams on an operation of a computing system according to some example embodiments.

Referring to FIG. 9, the computing system 100 may include a host 110, a buffer 111, a CXL switch 120, and CXL storage devices 130 and 140. The content described with reference to FIG. 2 to FIG. 8 may be applied to the host 110, the buffer 111, the CXL switch 120, and the CXL storage devices 130 and 140. No repeated content thereof will be provided.

The first CXL storage device 130 may store the third data DAT3 in the non-volatile memory 131, and the second CXL storage device 140 may store the second data DAT2 in the non-volatile memory 141.

The host 110 may transmit a read request on the first data DAT1 to the first CXL storage device 130 through the CXL.io protocol. The host 110 may transmit a buffer address PSA1 and the address of the first data DAT1 together with the read request. The buffer address PSA1 may be an address for writing the read first data DAT1. The address of the first data DAT1 may indicate the position where the first data DAT1 are written in the non-volatile memory 131. The first CXL storage device 130 may read the third data DAT3 from the non-volatile memory 131 based on the address of the first data DAT1. The first CXL storage device 130 may write the third data DAT3 to the buffer 111 based on the buffer address PSA1.

When receiving a read request for first data DAT1 from the host 110, the controller 132 may determine whether the second CXL storage device 140 has completed storing the second data DAT2. The controller 132 may operate differently based on whether the second CXL storage device 140 has completed storage.

In some example embodiments, controller 132 may transmit the first data DAT1 of FIG. 4 to the host 110 when the second CXL storage device 140 has not completed storing the second data DAT2. In some example embodiments, when the second CXL storage device 140 has not completed storing the second data DAT2, the controller 132 may stand by until the second CXL storage device 140 completes storing the second data DAT2.

Figure 10:
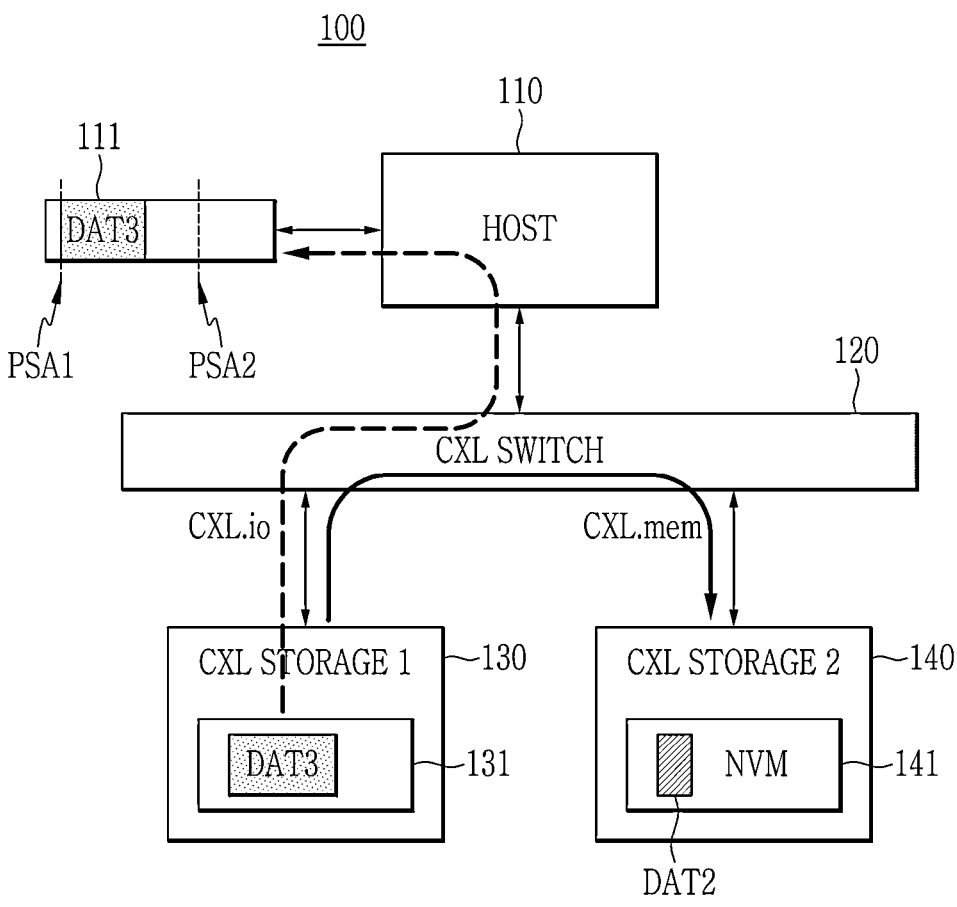

The example embodiments of FIG. 10 shows a case in which the second CXL storage device 140 has completed storing the second data DAT2. Referring to FIG. 10, when receiving a read request for the first data DAT1 from the host 110, the controller 132 may transmit the third data DAT3 excluding the second data DAT2 from among the first data DAT1 to the host 110. The controller 132 may read the third data DAT3 from the non-volatile memory 131 based on the addresses (e.g., P1 to P9) of the map table (e.g., 1300 in FIG.

7). The controller 132 may transmit the third data DAT3 to the host 110 using the CXL.io protocol.

Additionally, when the second CXL storage device 140 completes storing the second data DAT2, the controller 132 may request that the second CXL storage device 140 transmits the second data DAT2 to the host 110.

The controller 132 may request that the second CXL storage device 140 transmits the second data DAT2 to the host 110. The controller 132 may request transmission of the second data DAT2 to the second CXL storage device 140 using the CXL.mem protocol.

The controller 132 may generate a request signal of the second data DAT2 based on the address (e.g., P_CD2 in FIG. 7) of the map table (e.g., 1300 in FIG. 7). In some example embodiments, the request signal may include an address. The controller 132 may transmit a request signal of the second data DAT2 to the second CXL storage device 140.

The controller 132 may determine a buffer address PSA2 for the second CXL storage device 140 to write the second data DAT2 based on the buffer address PSA1 and the map table. For example, the controller 132 may obtain a length of the third data DAT3 on the map table, may add a length of the third data DAT3 to the buffer address PSA1, and may determine the buffer address PSA2. In some example embodiments, the controller 132 may determine the length of the third data DAT3 based on a difference between a start point and an end point of the third data DAT3 on the map table. The controller 132 may indicate the buffer address PSA2 to the second CXL storage device 140.

Figure 11:
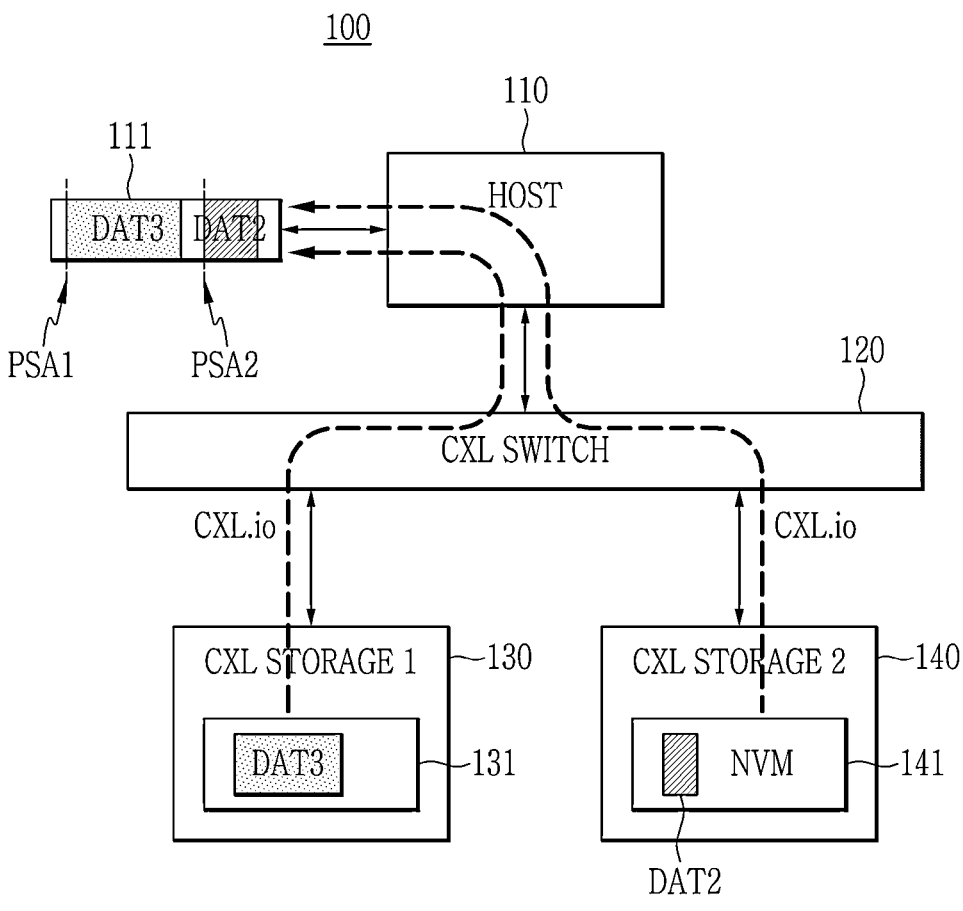

Referring to FIG. 11, the second CXL storage device 140 may transmit the second data DAT2 to the host 110 by using the CXL.io protocol in response to the transmission request of the controller 132. The second CXL storage device 140 may transmit the second data DAT2 to the buffer 111 based on the buffer address PSA2.

The first CXL storage device 130 may transmit the third data DAT3 from the buffer address PSA1 to the buffer address PSA2.

Figure 12:
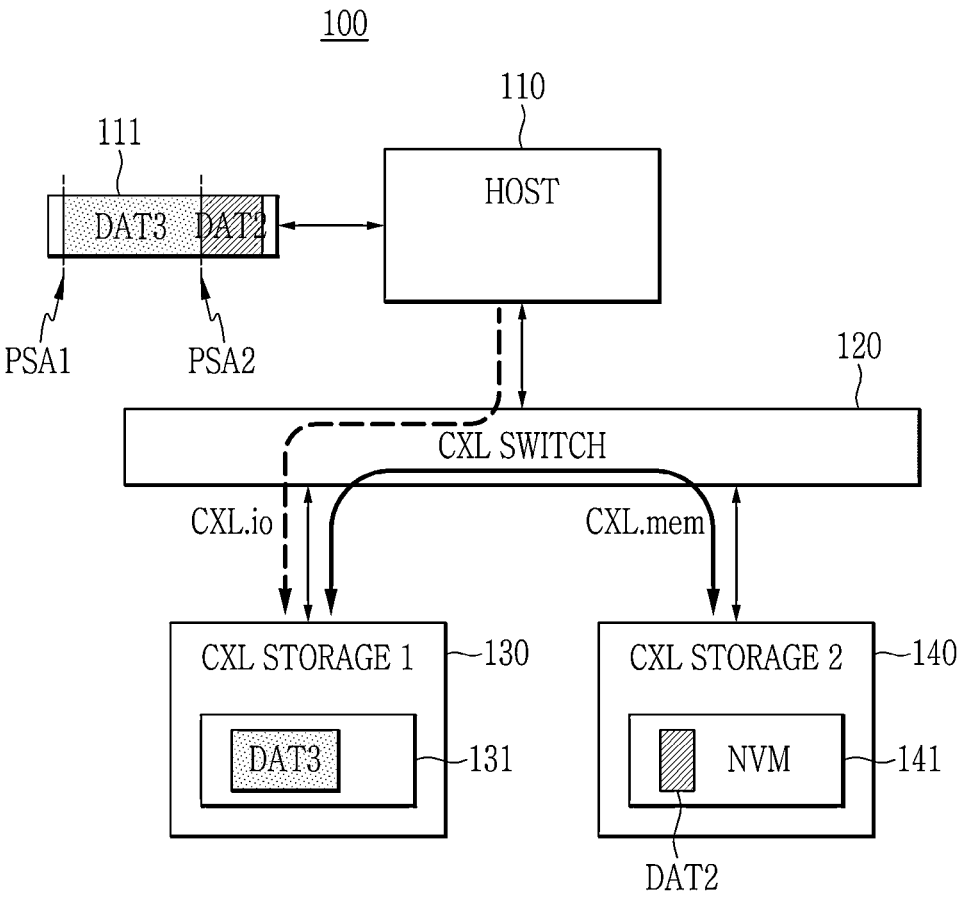

Referring to FIG. 12, the controller 132 may determine whether the controller 142 has completed transmission of the second data DAT2 to the buffer 111. The controller 132 may check the completion of transmission through the CXL.mem protocol. In some example embodiments, the controller 142 may transmit a transmission completed signal to the controller 132 when having completed the transmission of the second data DAT2. In some example embodiments, the controller 142 may change a state bit when having completed the transmission of the second data DAT2. The controller 132 may check the change of the state bit and may check that the second CXL storage device 140 has completed transmission of the second data DAT2.

When the controller 132 has completed transmission of the third data DAT3 and the controller 142 has completed transmission of the second data DAT2, they may transmit the transmission completed signal of the first data DAT1 to the host 110. The controller 132 may transmit the transmission completed signal of the first data DAT1 through the CXL.io protocol.

As described above, in response to the read request of the first data DAT1, the first CXL storage device 130 may transmit the third data DAT3, and the second CXL storage device 140 may transmit the second data DAT2, thereby reducing the latency on the first data DAT1 of the hosts (including 110) of the computing system 100, and alleviating or reducing the data skew.

Figure 13:
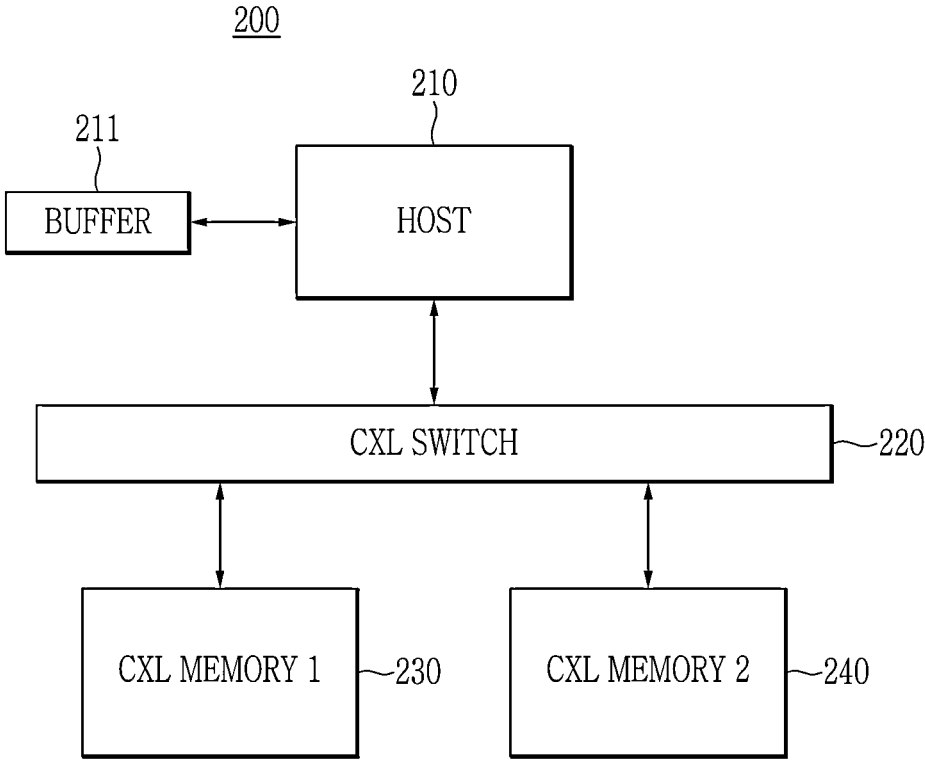
FIG. 13 shows a block diagram on a computing system according to some example embodiments.

FIG. 13 shows a block diagram on a computing system according to some example embodiments.

Referring to FIG. 13, the computing system 200 may include a host 210, a buffer 211, a CXL switch 220, a first CXL memory device 230, and a second CXL memory device 240. For better understanding and ease of description, FIG. 13 shows that the computing system 200 includes one host 210 and two CXL memory devices 230 and 240, to which the example embodiments are not limited, and the computing system 200 may include at least one host and at least two CXL memory devices.

The host 210 may transmit the instruction to at least one of the first CXL memory device 230 and the second CXL memory device 240. For example, the host 210 may include a CXL controller, and the CXL controller may communicate with the CXL memory devices 230 and 240 through the CXL switch 220.

The host 210 may be connected to the buffer 211 storing data. The buffer 211 may be used as a main memory or a system memory of the computing system 200. In some example embodiments, the buffer 211 may have various form factors such as the DRAM device, the DIMM, or the HBM. However, the range of the present disclosure is not limited thereto, and the buffer 211 may include the non-volatile memory such as the flash memory, the PRAM, the RRAM, the MRAM, or the FRAM.

The buffer 211 may communicate with the host 210 through the DDR interface. In some example embodiments, the host 210 may include a memory controller for controlling the buffer 211. However, the range of the present disclosure is not limited thereto, and the buffer 211 may communicate with the host 210 through various types of interfaces. The host 210 may be connected to at least one buffer 211 and may communicate with the same.

The buffer 211 may store data received from at least one of the first CXL memory device 230 and the second CXL memory device 240. According to the embodiment, the buffer 211 may be realized into the memory disposed in the host 210.

At least one of the first CXL memory device 230 and the second CXL memory device 240 may receive the instruction from the host 210. The CXL memory devices 230 and 240 may include a controller and a memory cell array. The memory cell array may write, output, or erase data based on the control of the controller. The CXL memory devices 230 and 240 may be volatile memories.

The host 210, the first CXL memory device 230, and the second CXL memory device 240 may communicate with each other through the CXL switch 220. The CXL switch 220 may be included in the CXL interface.

The CXL switch 220 may arbitrate the communication among the host 210, the first CXL memory device 230, and the second CXL memory device 240. For example, when the host 210 communicates with the CXL memory devices 230 and 240, the CXL switch 220 may transmit information such as requests, data, responses, or signals transmitted from the host 210 or the CXL memory devices 230 and 240 to the CXL memory devices 230 and 240 or the host 210 through the CXL.io protocol.

When the first CXL memory device 230 communicates with the second CXL memory device 240, the CXL switch 220 may transmit information such as requests, data, responses, or signals between the first CXL memory device 230 and the second CXL memory device 240 through the CXL.mem protocol.

The first CXL memory device 230 and the second CXL memory device 240 may communicate with each other through the CXL.mem protocol, and may be independently operable from the CXL.io protocol of the host 210. In other words, the first CXL memory device 230 may communicate with the host 210 through the CXL.io protocol, and may communicate with the second CXL memory device 240 through the CXL.mem protocol. Hence, the communication between the first CXL memory device 230 and the second CXL memory device 240 may give a limited influence to the input/output latency of the host 210.

The first CXL memory device 230 may determine the use ratio. The first CXL memory device 230 may move the data stored in the memory when the use ratio is greater than a reference value.

The first CXL memory device 230 may determine the target data to move. In some example embodiments, the first CXL memory device 230 may determine the target data based on the read request number. For example, the first CXL memory device 230 may determine the second data that are part of the first data having the greatest read request number as the target data.

The first CXL memory device 230 may determine the target device for moving the target data. In some example embodiments, the first CXL memory device 230 may determine at least one of the CXL devices (including the second CXL memory device 240) sharing a memory through the CXL switch 220 as the target device. The first CXL memory device 230 may determine the second CXL memory device 240 with the least use ratio from among the CXL devices as the target device.

The first CXL memory device 230 may determine the size of the target data. The first CXL memory device 230 may determine the size of the target data based on the first transmission rate between the first CXL memory device 230 and the host 210 and the second transmission rate between the second CXL memory device 240 and the host 210. For example, the first CXL memory device 230 may determine the size of the second data so that the ratio of the size occupied by the second data in the first data having the greatest read request number becomes 'second transmission rate/(first transmission rate+second transmission rate)'.

The first CXL memory device 230 may transmit the determined target data to the determined target device (the second CXL memory device 240). The second CXL memory device 240 may store the target data received from the first CXL memory device 230. When the host 210 transmits the read request on the first data to the first CXL memory device 230, the first CXL memory device 230 may transmit the third data that are exclusive of the second data from the first data to the host 210, and the second CXL memory device 240 may transmit the second data to the host 210. As described, when the use ratio of the first CXL memory device 230 is high, the second data that are part of the first data of the first CXL memory device 230 are dispersed to the second CXL memory device 240, thereby reducing the latency on the first data of the hosts (including 210) of the computing system 200 and alleviating or reducing the data skew.

Figure 14:
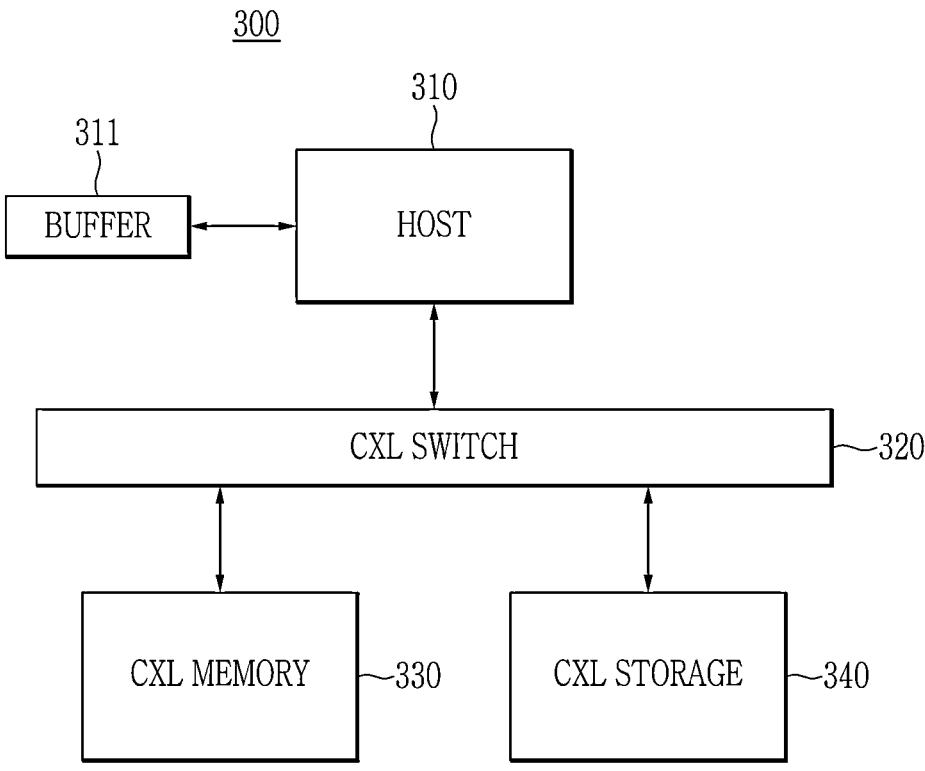
FIG. 14 shows a block diagram on a computing system according to some example embodiments.

FIG. 14 shows a block diagram on a computing system according to an embodiment.

Referring to FIG. 14, the computing system 300 may include a host 310, a buffer 311, a CXL switch 320, a CXL memory device 330, and a CXL storage device 340. For better understanding and ease of description, FIG. 13 shows that the computing system 300 includes one host 310, one CXL memory device 330, and one CXL storage device 340, but the embodiment is not limited thereto, and the computing system 300 may include one or more hosts, one or more CXL memories, and one or more CXL storage devices.

The description on the host 110, the buffer 111, the CXL switch 120, and the CXL storage devices 130 and 140 of FIG. 2 may be applied to the host 310, the buffer 311, the CXL switch 320, and the CXL storage device 340 of FIG. 14. Further, the description on the CXL memory devices 230 and 240 of FIG. 13 may be applied to the CXL memory device 330 of FIG. 14. No repeated content thereof will be provided.

That is, when the use ratio of the CXL memory device 330 is high, the second data that are part of the first data having a high use frequency (having a great read request number) in the CXL memory device 330 are dispersed to the CXL storage device 340, thereby reducing the latency on the first data of the hosts (including 310) of the computing system 300 and alleviating or reducing the data skew. In a like way, when the use ratio of the CXL storage device 340 is high, part of the data having a great use frequency of the CXL storage device 340 may be dispersed to the CXL memory device 330.

Figure 15:
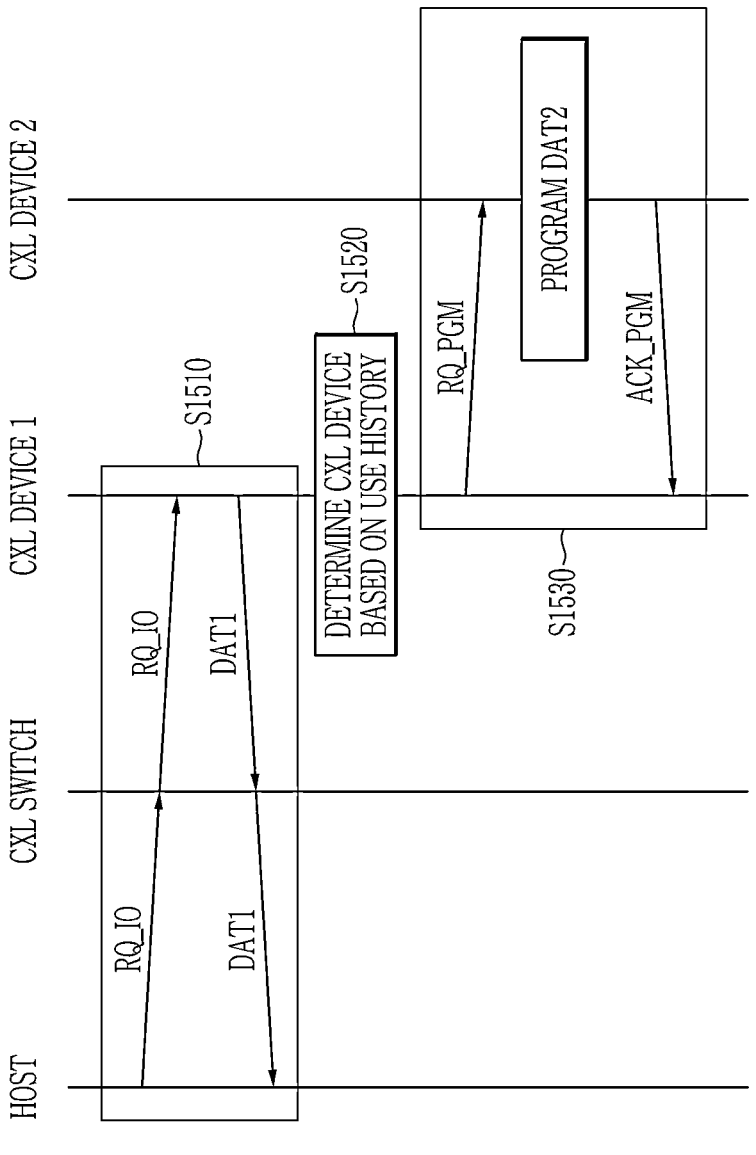
FIG. 15 shows a flowchart on a data storing method between CXL devices according to some example embodiments.

FIG. 15 shows a flowchart on a data storing method between CXL devices according to some example embodiments. FIG. 15 shows a case in which the CXL device (e.g., first CXL device (CXL DEVICE 1)) moves data to another CXL device (e.g., second CXL device (CXL DEVICE 2)) to store the data.

Referring to FIG. 15, the host may transmit an instruction (RQ_IO) for reading the first data DAT1 to the first CXL device through the CXL switch (CXL SWITCH) (S1510). The host may transmit the instruction (RQ_IO) through the CXL.io protocol. The first CXL device may transmit the stored first data DAT1 to the host in response to the instruction (RQ_IO). The first CXL device may transmit the first data DAT1 to the buffer memory connected to the host through the CXL.io protocol.

The first CXL device may determine another CXL device based on a use record (S1520). For example, the first CXL device may determine the use ratio based on the use record. The use ratio may indicate an operation time of the first CXL device with ratios for a unit time (e.g., one hour, one day, one week, one month, etc.). The first CXL device may determine another CXL device when the use ratio is greater than a reference value. The first CXL device may determine at least one of other CXL devices connected through the CXL switch as the target device. The target device may represent the device for moving the data stored in the first CXL device. The first CXL device may determine the CXL device of which the use ratio is equal to or less than a reference value from among the CXL devices as the target device. In some example embodiments, the first CXL device may determine the CXL device having the lowest use ratio from among the CXL devices as the target device.

The first CXL device may determine the target data based on the read request number. For example, when the read request number (e.g., the receiving number of the instruction (RQ_IO)) of the first data DAT1 is the greatest from among the data stored in the first CXL device, the second data DAT2 that are at least part of the first data DAT1 may be determined as the target data. The second data DAT2 may correspond to an end portion of the first data DAT1.

The first CXL device may transmit an instruction (RQ_PGM) for writing the second data DAT2 to the second CXL device that is the target device (S1530). The first CXL device may transmit the instruction (RQ_PGM) through the CXL.mem protocol. The second CXL device may write the second data DAT2 in response to the instruction (RQ_PGM). The second CXL device may transmit a completion signal (ACK_PGM) to the first CXL device when the writing of the second data DAT2 is completed. The second CXL device may transmit the completion signal (ACK_PGM) through the CXL.mem protocol. In some example embodiments, the first CXL device may transmit an address for writing the second data DAT2 to the second CXL device. In some example embodiments, the second CXL device may write the second data DAT2, and may transmit the address having written the second data DAT2 to the first CXL device. The first CXL device may write the address of the second data DAT2 to the map table.

Figure 16:
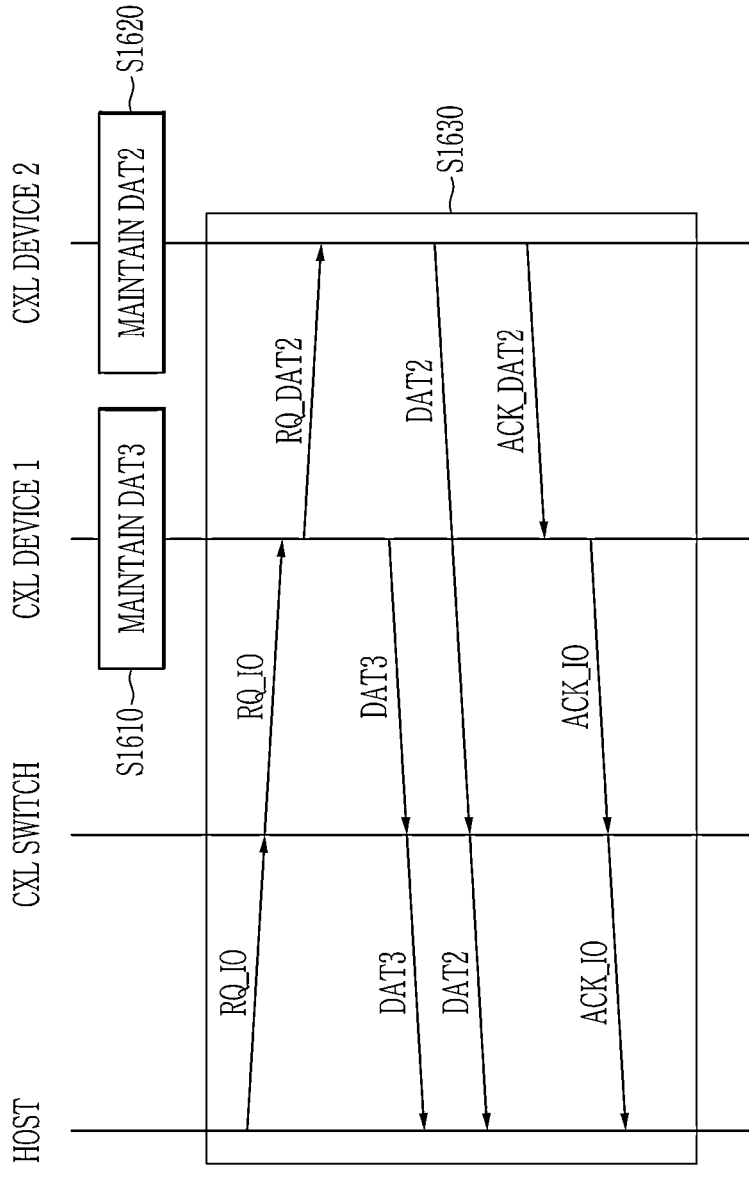
FIG. 16 shows a flowchart on a data transmitting method by CXL devices according to some example embodiments.

FIG. 16 shows a flowchart on a data transmitting method by CXL devices according to some example embodiments. FIG. 16 shows that the first CXL device and the second CXL device transmit data to the host in response to a read request of the host.

Referring to FIG. 16, the first CXL device may maintain the third data DAT3 (S1610). The third data DAT3 may represent data that are exclusive of the second data DAT2 from the first data DAT1 of FIG. 15.

The second CXL device may maintain the second data DAT2 (S1620). The second data DAT2 may correspond to the end portion of the first data DAT1.

The host may transmit an instruction (RQ_IO) for reading the first data DAT1 to the first CXL device (S1630). The host may transmit the instruction (RQ_IO) through the CXL.io protocol. The first CXL device may check the map data in response to the instruction (RQ_IO). The first CXL device may read the third data DAT3 based on the map data, and may transmit the third data DAT3 to the host through the CXL switch. The first CXL device may transmit the third data DAT3 to the buffer memory connected to the host through the CXL.io protocol.

Further, the first CXL device may transmit an instruction (RQ_DAT2) for reading the second data DAT2 to the second CXL device based on the map data. The first CXL device may transmit the instruction (RQ_DAT2) to the second CXL device through the CXL switch. The host may transmit the instruction (RQ_DAT2) through the CXL.mem protocol. FIG. 16 shows that the transmission of the instruction (RQ_DAT2) precedes the transmission of the third data DAT3, but the embodiment is not limited thereto, the transmission of the instruction (RQ_DAT2) and the transmission of the third data DAT3 may be simultaneously generated or the transmission of the instruction (RQ_DAT2) may follow the transmission of the third data DAT3.

The second CXL device may transmit the second data DAT2 to the host through the CXL switch. The second CXL device may transmit the second data DAT2 to the buffer memory connected to the host through the CXL.io protocol.

The second CXL device may transmit a completion signal (ACK_DAT2) to the first CXL device when transmission of the second data DAT2 is completed. In an embodiment, the first CXL device may check completion of transmission of the second data DAT2 by the second CXL device by checking a bit of one region of the second CXL device.

The first CXL device may transmit a completion signal (ACK_IO) on the instruction (RQ_IO) to the host through the CXL switch when receiving the completion signal (ACK_DAT2) from the second CXL device.

Figure 17:
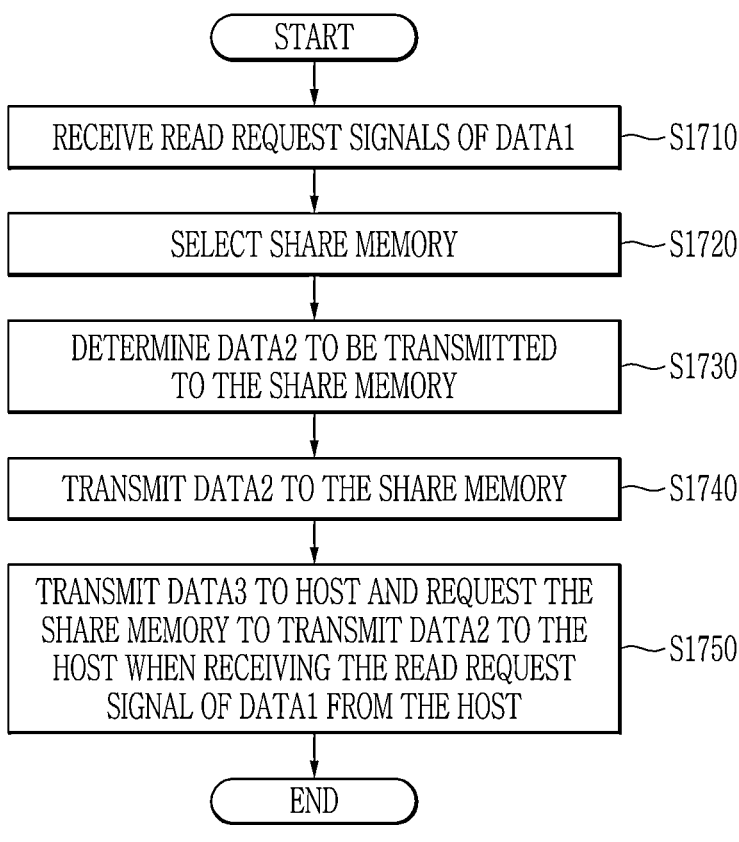
FIG. 17 shows a flowchart on a data storing method according to some example embodiments.

FIG. 17 shows a flowchart on a data storing method according to some example embodiments.

Referring to FIG. 17, the data storing method may be performed by the CXL device. The CXL device is connected to the host through the CXL switch, and may be realized with the CXL memory device, the CXL storage device, etc. The CXL device may receive a first read request of the first data DATA1 from the host (S1710). The CXL device may transmit the first data DATA1 to the host. The host and the CXL device may transmit and receive the read request and the first data DATA1 to/from each other through the CXL switch.

The CXL device may select one of the share memories when the receiving number of the first read requests is greater than a reference number (S1720). The share memories may be connected by the CXL device through the CXL switch.

The CXL device may determine the second data DATA2 transmitted to the selected share memory (S1730). The CXL device may determine the second data DATA2 based on the size of the first data DATA1, the first transmission rate of the selected share memory, and the second transmission rate of the CXL device. The first transmission rate and the second transmission rate may respectively represent a rate between the device and the host. The CXL device may determine the end portion with a predetermined or alternatively desired size in the first data DATA1. The CXL device may determine the predetermined or alternatively desired size based on the first transmission rate and the second transmission rate.

The CXL device may write the second data DATA2 to the selected share memory (S1740). The CXL device may transmit the second data DATA2 to the selected share memory by using the CXL.mem protocol.

When receiving the second read request of the first data DATA1 from the host, the CXL device may request transmission of the second data DATA2 to the selected share memory, and may transmit the third data DATA3 that are exclusive of the second data DATA2 from among the first data DATA1 to the host (S1750). The CXL device may transmit the third data DATA3 to the host through the CXL.io protocol, and may transmit the transmission of the second data DATA2 to the share memory through the CXL.mem protocol.

Figure 18:
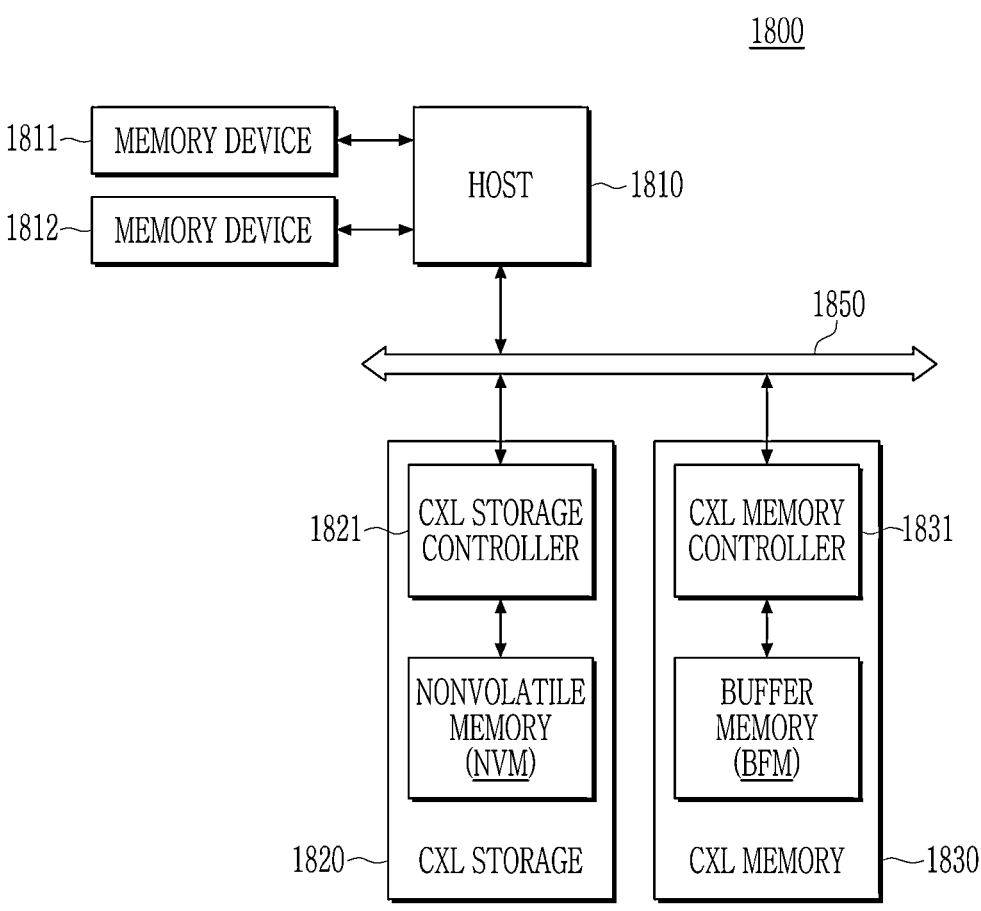
FIG. 18 shows a block diagram on a computing system according to some example embodiments.

FIG. 18 shows a block diagram on a computing system according to some example embodiments.

Referring to FIG. 18, the computing system 1800 may include a host 1810, memory devices 1811 and 1812, a CXL storage 1820, and a CXL memory 1830. In some example embodiments, the computing system 1800 may be included in user devices such as a personal computer, a laptop computer, a server, a data center, a media player, or a digital camera, or in automotive devices such as a GPS, a black box, or a vehicle electric device. Alternatively, the computer system 1800 may be a mobile system such as a mobile phone, a smart phone, a tablet personal computer, a wearable device, a healthcare device, or an Internet of things (IoT) device. In an embodiment, the computing system 1800 may provide an artificial intelligence (AI) service.

The host 1810 may control a general operation of the computing system 1800. In an embodiment, the host 1810 may be one of various processors such as the CPU, the GPU, the NPU, or the DPU. In some example embodiments, the host 1810 may include a single core processor or a multi-core processor.

The memory devices 1811 and 1812 may be used as a main memory or a system memory of the computing system 1800. In some example embodiments, the memory devices 1811 and 1812 may respectively be DRAM devices, and may have various form factors such as the DIMM or the HBM. However, the range of the present disclosure is not limited thereto, and the memory devices 1811 and 1812 may include non-volatile memories such as the flash memory, the PRAM, the RRAM, the MRAM, or the FRAM.

The memory devices 1811 and 1812 may directly communicate with the host 1810 through the DDR interface. In some example embodiments, the host 1810 may include a memory controller for controlling the memory devices 1811 and 1812. However, the range of the present disclosure is not limited thereto, and the memory devices 1811 and 1812 may communicate with the host 1810 through various types of interfaces.

The CXL storage 1820 may include a CXL storage controller 1821 and a non-volatile memory NVM. The CXL storage controller 1821 may store the data in the non-volatile memory NVM or may transmit the data stored in the non-volatile memory NVM to the host 1810 or the CXL memory 1830 according to control by the host 1810. The non-volatile memory NVM may store the data, and may maintain the data when the CXL storage 1820 is turned off. In some example embodiments, the non-volatile memory NVM may be a NAND flash memory, and the range of the present disclosure is not limited thereto.

The CXL memory 1830 may include a CXL memory controller 1831 and a buffer memory BFM. The CXL memory controller 1831 may store data in the buffer memory BFM or may transmit the data stored in the buffer memory BFM to the host 1810 according to control by the host 1810. For example, the CXL memory controller 1831 may store the data of the memory devices 1811 and 1812 or the CXL storage 1820 in the buffer memory BFM according to control by the host 1810. In some example embodiments, the buffer memory BFM may be a DRAM, and the range of the present disclosure is not limited thereto.

In some example embodiments, the host 1810, the CXL storage 1820, and the CXL memory 1830 may have a same interface. For example, the host 1810, the CXL storage 1820, and the CXL memory 1830 may communicate with each other through the CXL interface 1850. In some example embodiments, the CXL interface 1850 may indicate a low latency and a high-bandwidth link for enabling various connections among the accelerators, the memory devices, or various electronic devices by supporting coherence, memory access, and dynamic protocol multiplexing of input/output protocols.

In some example embodiments, the CXL storage 1820 may access the CXL memory 1830 through the CXL interface 1850. For example, the CXL storage 1820 may store data in the allocated one of the areas of the CXL memory 1830 or may read the stored data. The CXL memory 1830 may store data in the buffer memory BFM or may transmit the data stored in the buffer memory BFM to the CXL storage 1820 according to control by the CXL storage 1820.

The CXL storage controller 1821 of the CXL storage 1820 may communicate with the host 1810 and the CXL memory 1830 (e.g., buffer memory) through the CXL interface 1850. In other words, the CXL storage controller 1821 of the CXL storage 1820 may communicate with the host 1810 and the CXL memory 1830 through an interface of a same kind or a common interface, and may use a predetermined or alternatively desired area of the CXL memory 1830 as a buffer memory.

The example embodiments on the CXL storage devices 130 and 140 described with reference to FIG. 2 to FIG. 12 may be applied to the CXL storage 1820. That is, the CXL storage controller 1821 may transmit the target data to the CXL memory 1830 connected through the CXL interface 1850 when the use ratio is greater than a reference value. The target data may represent the second data that are part of the first data. The CXL storage controller 1821 may transmit the third data to the memory device 1811 or 1812 from the non-volatile memory NVM when receiving a read request on the first data from the host 1810. The third data may represent data that are exclusive of the second data from among the first data. The CXL storage controller 1821 may request transmission of the second data to the CXL memory 1830. The CXL memory controller 1831 may transmit the second data to the memory device 1811 or 1812 from the buffer memory BFM in response to the request of the CXL storage controller 1821.

In some example embodiments, the host 1810, the CXL storage 1820, and the CXL memory 1830 are shown to communicate with each other through the CXL interface 1850, but the present range is not limited thereto, and the host 1810, the CXL storage 1820, and the CXL memory 1830 may communicate with each other based on various types of computing interfaces such as a GEN-Z protocol, an NVLink protocol, a CCIX protocol, and an Open CAPI protocol.

Further, the CXL storage 1820 is described to use the CXL memory 1830 in the present embodiment, but the example embodiments are not limited thereto, and the CXL memory 1830 may use the CXL storage 1820.

Figure 19:
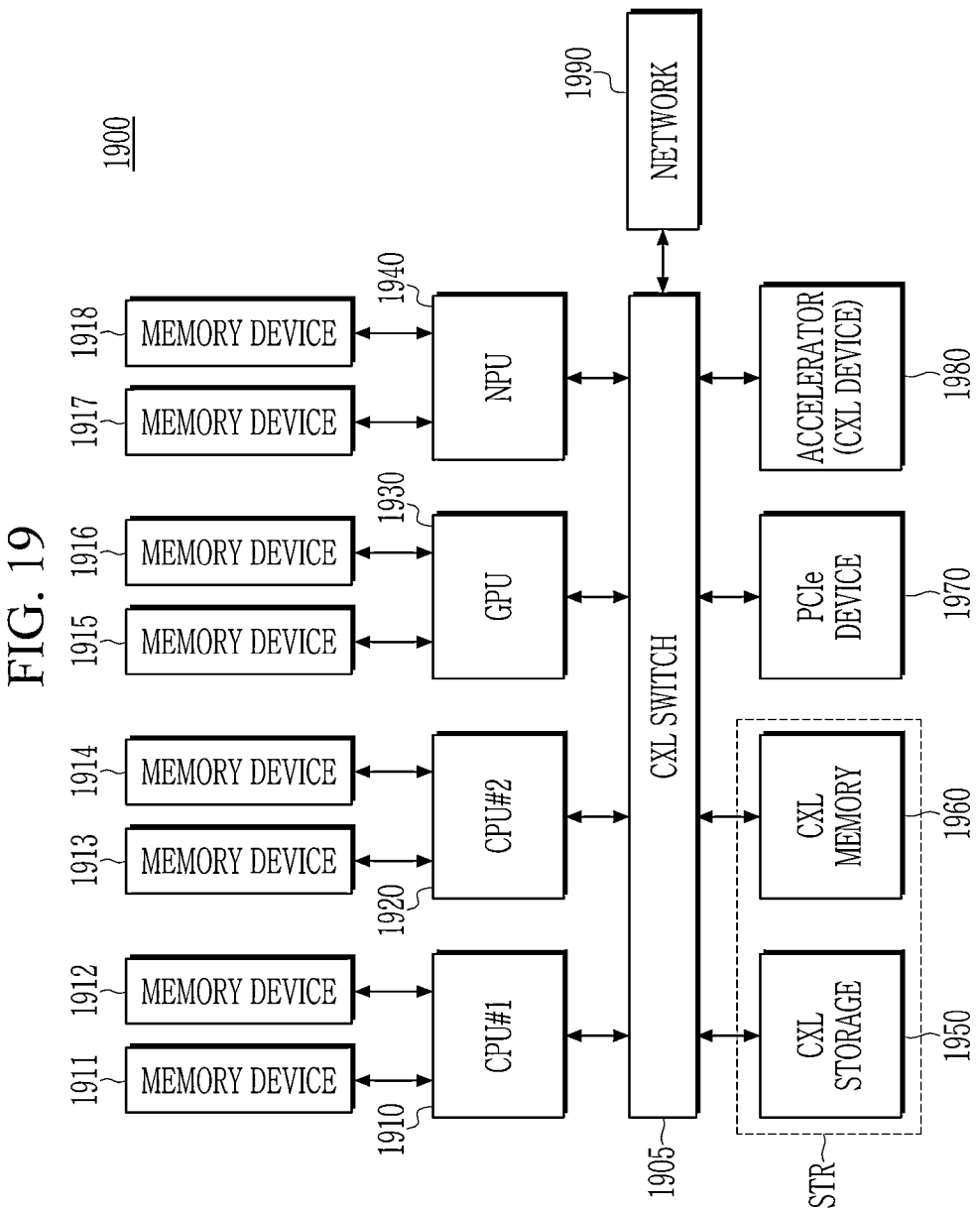
FIG. 19 shows a block diagram on a computing system according to some example embodiments.

FIG. 19 shows a block diagram on a computing system according to some example embodiments. For better understanding and ease of description, no detailed content on the above-described constituent elements will be provided.

Referring to FIG. 19, the computing system 1900 may include a CXL switch 1905, a first CPU 1910, a second CPU 1920, a GPU 1930, an NPU 1940, a CXL storage 1950, a CXL memory 1960, a PCIe device 1970, and an accelerator (or a CXL device) 1980.

The first CPU 1910, the second CPU 1920, the GPU 1930, the NPU 1940, the CXL storage 1950, the CXL memory 1960, the PCIe device 1970, and the accelerator (or the CXL device) 1980 may be connected to the CXL switch 1905 in common, and may communicate with each other through the CXL switch 1905.

In some example embodiments, the first CPU 1910, the second CPU 1920, the GPU 1930, and the NPU 1940 may respectively be the host described with reference to FIG. 1 to FIG. 18, and may respectively be connected to the memory devices 1911 to 1918. In some example embodiments, the CXL storage 1950 may be the CXL storage devices 130 and 140 described with reference to FIG. 2 to FIG. 12. In some example embodiments, the CXL memory 1960 may be the CXL memory devices 230, 240, and 1830 described with reference to FIG. 13 and FIG. 18. For example, the CXL storage 1950 or the CXL memory 1960 may determine other CXL devices (e.g., 1950, 1960, and 1970) as the target devices when the use ratio is greater than a reference value. The CXL storage 1950 or the CXL memory 1960 may move data to the target device and may store the data. Hence, the bottle neck phenomenon of data according to the read request of the hosts may be alleviated or reduced and the data skew caused by the bottle neck phenomenon of data may be alleviated or reduced.

At least a predetermined or alternatively desired area of the CXL memory 1960 may be allocated as an exclusive area for the CXL storage 1950 by at least one of the first CPU 1910, the second CPU 1920, the GPU 1930, and the NPU 1940

That is, the CXL storage 1950 and the CXL memory 1960 may be used as a storage space STR of the computing system 1900.

In some example embodiments, the CXL switch 1905 may be connected to the PCIe device 1970 or the accelerator 1980 for supporting various functions, and the PCIe device 1970 or the accelerator 1980 may communicate with the first CPU 1910, the second CPU 1920, the GPU 1930, and the NPU 1940 through the CXL switch 1905 or may access the storage space STR including the CXL storage 1950 and the CXL memory 1960.

In some example embodiments, the CXL switch 1905 may be connected to an external network 1990 (or a fabric), and may communicate with an external server through the external network 1990 (or the fabric).

In some example embodiments, the computing system 1900 may further include at least one of the CXL storage and the CXL memory, and at least one of the CXL storage and the CXL memory may be used for data dispersion.

Figure 20:
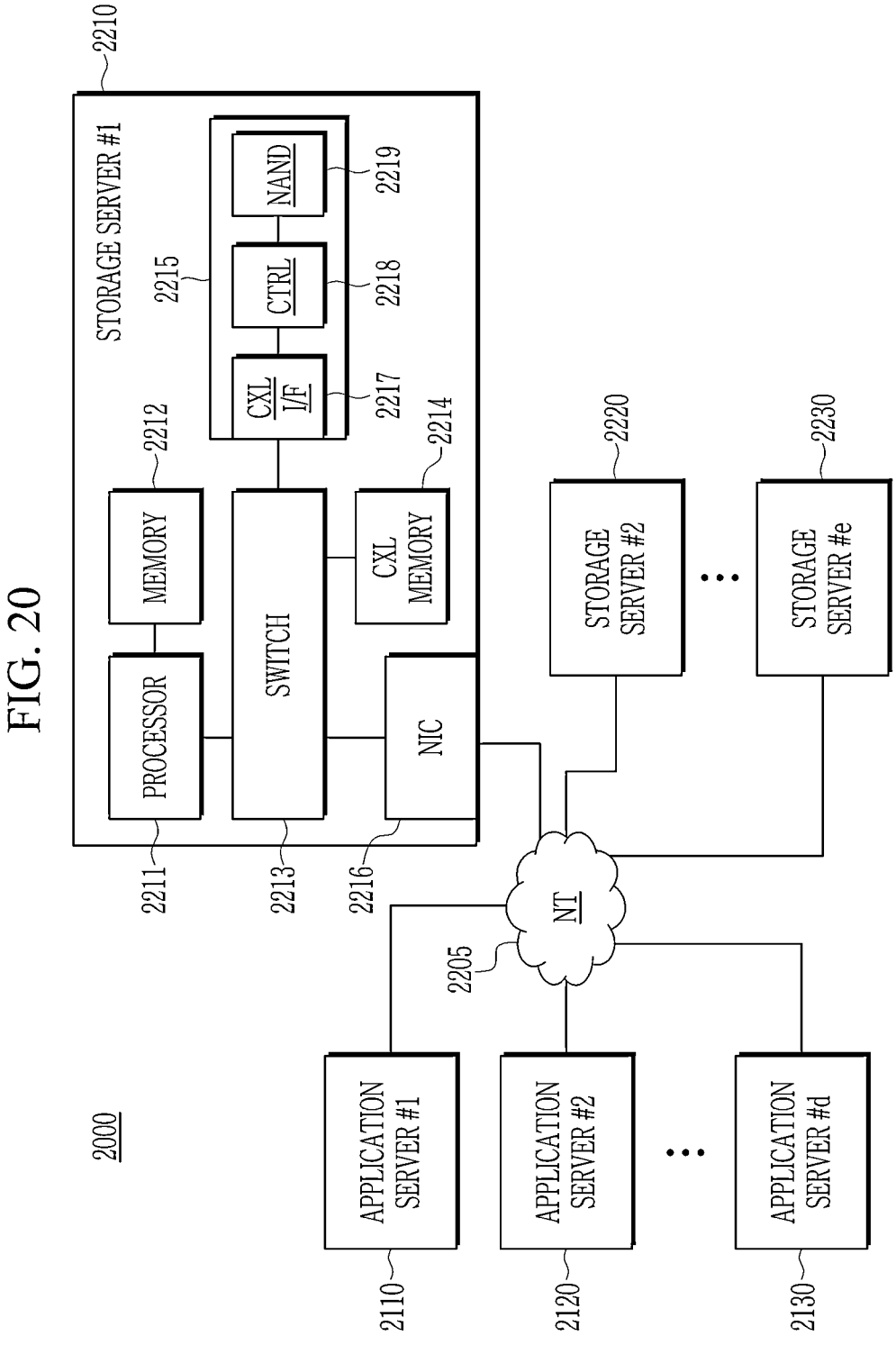
FIG. 20 shows a block diagram on a server to which a computing system is applied according to some example embodiments.

FIG. 20 shows a block diagram on a server to which a computing system is applied according to an embodiment.

Referring to FIG. 20, the server 2000 collects various data and provides services, and may be referred to as a data center or a data storage center. The server 2000 may be a system for operating search engines and databases, and may be a computing system used by companies such as banks or government organizations. The server 2000 may include application servers 2110 to 2130 and storage servers 2210 to 2230. The number of the application servers 2110 to 2130 and the number of the storage servers 2210 to 2230 may be selected in many ways depending on embodiments, and the number (d, d is an integer that is greater than 1) of the application servers 2110 to 2130 and the number (e, e is an integer that is greater than 1) of the storage servers 2210 to 2230 may be different from each other.

A configuration of the first storage server 2210 may now be mainly described. The application servers 2110 to 2130 and the storage servers 2210 to 2230 may have similar configurations, and the application servers 2110 to 2130 and the storage servers 2210 to 2230 may communicate with each other through the network (NT) 2205.

The first storage server 2210 may include a processor 2211, a memory 2212, a switch 2213, a CXL memory 2214, a storage device 2215, and a network interface card (NIC) 2216. The processor 2211 may control a general operation of the first storage server 2210, and may access the memory 2212 to execute the instruction loaded on the memory 2212 or process data. The memory 2212 may be a double data rate synchronous DRAM (DDR SDRAM), a hybrid memory cube (HMC), an HBM, a DIMM, an optane DIMM and/or a non-volatile DIMM (NVMDIMM). The processor 2211 and the memory 2212 may be directly connected to each other, and the number of the processors 2211 and the number of the memories 2212 included in one storage server 2210 may be selected in various ways.

In some example embodiments, the processor 2211 and the memory 2212 may provide a processor-memory pair. In some example embodiments, the number of the processors 2211 and the number of the memories 2212 may be different from each other. The processor 2211 may include a single core processor or a multi-core processor. The description on the storage server 2210 may be similarly applied to the respective application servers 2110 to 2130.

The switch 2213 may arbitrate or route the communication among various constituent elements included in the first storage server 2210. In some example embodiments, the switch 2213 may be a CXL switch realized based on the CXL interface.

The CXL memory 2214 may be connected to the switch 2213. In some example embodiments, the CXL memory 2214 may be used as a memory expander for the processor 2211. Alternatively, the CXL memory 2214 may be allocated as an exclusive memory or a buffer memory for the storage device 2215.

The storage device 2215 may include a CXL interface circuit (CXL_IF) 2217, a controller (CTRL) 2218, and a NAND flash (NAND) 2219. The storage device 2215 may store data or output the stored data according to the request of the processor 2211. In some example embodiments, the storage device 2215 may receive at least a predetermined or alternatively desired area of the CXL memory 2214 as an exclusive area, and may use the exclusive area as the buffer memory.

In some example embodiments, the storage device 2215 may be the CXL storage devices 130 and 140 described with reference to FIG. 2 to FIG. 12. In an embodiment, the CXL memory 2214 may be the CXL memory devices 230, 240, and 1830 described with reference to FIG. 13 and FIG. 18. For example, the storage device 2215 (or the CXL memory 2214) may determine the CXL memory 2214 (or the storage device 2215) as the target device when the use ratio is greater than a reference value. The storage device 2215 (or the CXL memory 2214) may store data to the target device and may store the data. Hence, the bottle neck phenomenon of data according to the read requests of the hosts including the processor 2211 may be alleviated and the data skew caused by the bottle neck phenomenon of data may be alleviated.

The network interface card (NIC) 2216 may be connected to the switch 2213. The NIC 2216 may communicate with other storage servers 2220 to 2230 or other application servers 2110 to 2130 through the network 2205.

In some example embodiments, the NIC 2216 may include a network interface card, and a network adapter. The NIC 2216 may be connected to the network 2205 by a wired interface, a wireless interface, a Bluetooth interface, and an optical interface. The NIC 2216 may include an internal memory, a digital signal processor (DSP), and a host bus interface, and may be connected to the processor 2211 and/or the switch 2213 through the host bus interface. In some example embodiments, the NIC 2216 may be combined to at least one of the processor 2211, the switch 2213, and the storage device 2215.

In some example embodiments, the network 2205 may be realized with a fiber channel (FC) or the Ethernet. In this instance, the FC is a medium for transmitting data at high rates, and may use an optical switch for providing high performance/high availability. The storage servers 2210 to 2230 may be provided as a file storage, a block storage, or an object storage according to access methods of the network 2205.

In some example embodiments, the network 2205 may be storage-only network such as a storage area network (SAN). For example, the SAN may be a FC-SAN using the FC network and realized according to a FC protocol (FCP). For another example, the SAN may be an IP-SAN using a TCP/IP network and realized according to a SCSI over TCP/IP or Internet SCSI (ISCSI) protocol. In some example embodiments, the network 2205 may be a general network such as the TCP/IP network. For example, the network 2205 may be realized according to the protocol such as a FC over Ethernet (FCoE), a network attached storage (NAS), or a NVMe over fabrics (NVMe-oF).

In some example embodiments, at least one of the application servers 2110 to 2130 may store the data requested to be stored in a user or a client in one of the storage servers 2210 to 2230 through the network 2205. At least one of the application servers 2110 to 2130 may obtain the data requested to be read by the user or the client from one of the storage servers 2210 to 2230 through the network 2205. For example, at least one of the application servers 2110 to 2130 may be realized with a web server or a database management system (DBMS).

In some example embodiments, at least one of the application servers 2110 to 2130 may access the memory, the CXL memory, or the storage device included in another application server through the network 2205, or may access the memories, the CXL memories, or the storage devices included in the storage servers 2210 to 2230 through the network 2205. Hence, at least one of the application servers 2110 to 2130 may perform various operations on the data stored in the other application servers and/or the storage servers 2210 to 2230. For example, at least one of the application servers 2110 to 2130 may perform instructions for shifting or copying the data between the application servers and/or the storage servers 2210 to 2230. In this instance, the data may pass through the memories or the CXL memories of the storage servers 2210 to 2230 from the storage device of the storage servers 2210 to 2230 or may directly move to the memory or the CXL memory of the application servers 2110 to 2130. The data moved through the network 2205 may be encrypted for security or privacy.

In some example embodiments, the storage device included in at least one of the application servers 2110 to 2130 and the storage servers 2210 to 2230 may receive the CXL memory included in at least one of the application servers 2110 to 2130 and the storage servers 2210 to 2230 as an exclusive area, and may use the exclusive area as the buffer memory. For example, the storage device 2215 included in the storage server 2210 may receive the CXL memory included in another storage server (e.g., 2230), and may access the CXL memory included in another storage server (e.g., 2230) through the switch 2213 and the NIC 2216. In this case, the data of the storage device 2215 of the first storage server 2210 may be stored in the CXL memory of the storage server 2230. That is, the storage devices and the CXL memories of the server 2000 according to the present disclosure may be connected and realized in many ways.

In some example embodiments, each constituent element or a combination of two or more constituent elements described with reference to FIG. 1 to FIG. 20 may be implemented as a digital circuit, a programmable or non-programmable logic device or array, an application specific integrated circuit (ASIC), or the like.

While these inventive concepts have been described in connection with what is presently considered to be example embodiments, it is to be understood that the inventive concepts are not limited to the disclosed example embodiments, but, on the contrary, is intended to cover various modifications and equivalent arrangements included within the spirit and scope of the appended claims.

What is claimed is:

1. A compute express link (CXL) device comprising:
a memory configured to store first data; and
a first control logic configured to calculate a first use ratio of the CXL device, the first control logic configured to output second data that are part of the first data, to an external share memory through a CXL interface in response to the first use ratio being greater than a reference value, the first data being stored in the CXL device, the external share memory being external to the CXL device such that the first control logic is configured to communicate with the external share memory including a second control logic through a CXL switch.

2. The CXL device of claim 1, wherein
the first control logic obtains an address in which the external share memory stores the second data and writes the address to a map table.

3. The CXL device of claim 2, wherein
the first control logic is configured to communicate with a host through a CXL.io protocol,
communicate with the external share memory through a CXL.mem protocol,
the first control logic is configured to, in response to receiving a read request of the first data from the host, transmit third data that are exclusive of the second data from among the first data to the host, and transmit a request signal for requesting the external share memory to transmit the second data to the host to the external share memory, and
the request signal includes the address.

4. The CXL device of claim 3, wherein
the first control logic is configured to determine whether the external share memory has completed storing the second data,
the first control logic is configured to transmit the request signal for requesting the external share memory to transmit the second data to the host to the external share memory in response to the first control logic receiving the read request of the first data from the host and the external share memory having completed storing the second data, and
the first control logic is configured to transmit the first data to the host in response to the external share memory having not completed storing the second data.

5. The CXL device of claim 1, wherein
the first control logic is configured to obtain a first transmission rate between the CXL device and a host, and the first control logic is configured to determine a ratio between the first data and the second data based on the first transmission rate.

6. The CXL device of claim 5, wherein
the first control logic is configured to obtain a second transmission rate between the host and the external share memory and is configured to determine the ratio based on the first transmission rate and the second transmission rate.

7. The CXL device of claim 6, wherein
the first control logic is configured to determine the ratio of the first data and the second data so that '(the first transmission rate)/(the first transmission rate+the second transmission rate)' corresponds to 'a size of the second data/a size of the first data'.

8. The CXL device of claim 1, wherein
the first control logic is configured to determine a read request number of data stored in the memory and is configured to determine data having a greatest read request number as the first data.

9. The CXL device of claim 8, wherein
the first control logic is configured to determine the data with a second greatest read request number as third data and is configured to output some of the third data to the external share memory.

10. The CXL device of claim 1, wherein
the first control logic is configured to obtain a first time for transmitting the first data to a host, obtain a second transmission rate between the host and the external share memory, and determine whether to output the second data based on the first time, the second transmission rate, and a size of the second data.

11. The CXL device of claim 10, wherein the first control logic is configured to calculate a second time of the external share memory based on the second transmission rate and the size of the second data, output the second data to the external share memory in response to the first time being longer than the second time, and in response to the first time being equal to or shorter than the second time, not output the second data to the external share memory.

12. The CXL device of claim 1, wherein the first control logic is configured to obtain a first time for transmitting the first data to a host, obtain a first transmission rate between the CXL device and the host, obtain a second transmission rate between the host and the external share memory, and determine whether to output the second data based on the first time, the first data, the second data, the first transmission rate, and the second transmission rate.

13. The CXL device of claim 12, wherein the first control logic is configured to calculate a second time for transmitting third data based on the first transmission rate and a size of the third data, the third data being exclusive of the second data from among the first data, calculate a third time for transmitting the second data based on the second transmission rate and a size of the second data, output the second data to the external share memory in response to the first time being longer than a sum of the second time and the third time, and in response to the first time being equal to or shorter than a sum of the second time and the third time, not outputting the second data to the external share memory.

14. The CXL device of claim 1, wherein the first control logic is configured to obtain a second use ratio of CXL devices shared through the CXL interface and determine one of the CXL devices as the external share memory based on the second use ratio.

15. An electronic device comprising:

a first compute express link (CXL) device including a first control logic, the first control logic configured to instruct the first CXL device to store second data that are part of first data to a second CXL device in response to a read request on the first data being greater than a reference number;

the second CXL device including a second control logic, the second control logic configured to instruct the second CXL device to store the second data in response to a request of the first CXL device; and a switch configured to connect the first CXL device and the second CXL device.

16. The electronic device of claim 15, wherein the first CXL device is configured to transmit the second data to the second CXL device in response to the read request within a reference time being greater than the reference number.

17. The electronic device of claim 15, wherein the first CXL device is configured to receive the read request from a host by using a CXL.io protocol, and is configured to transmit the second data to the second CXL device by using a CXL.mem protocol.

18. The electronic device of claim 17, wherein in response to receiving the read request on the first data from the host, the first CXL device is configured to transmit third data that are exclusive of the second data from among the first data to the host by using the CXL.io protocol, and the first CXL device is configured to request transmission of the second data to the second CXL device by using the CXL.mem protocol, and the second CXL device is configured to transmit the second data to the host by using the CXL.io protocol in response to a transmission request of the first CXL device.

19. The electronic device of claim 18, wherein the first CXL device is configured to transmit a transmission completed signal of the first data to the host when the second CXL device completes transmission of the second data.

20. A method for storing data comprising:

transmitting first data to a host in response to a device receiving a first read request on the first data from the host;

selecting a selected share memory external to the device in response to a receiving number of the first read request being greater than a reference number;

determining second data that are part of the first data based on a size of the first data, a first transmission rate of the selected share memory, and a second transmission rate of the device;

writing the second data to the selected share memory external to the device; and requesting, with a control logic within the device, transmission of the second data from the selected share memory external to the device and transmitting third data that are exclusive of the second data from among the first data from the device to the host in response to the device receiving a second read request of the first data from the host.

* * * * *